(12) United States Patent
Tattersfield et al.

(10) Patent No.: US 9,046,072 B2
(45) Date of Patent: Jun. 2, 2015

(54) METHOD AND SYSTEM FOR HARNESSING WIND ENERGY USING A TETHERED AIRFOIL

(75) Inventors: Michael Andrew Tattersfield, Vancouver (CA); Joel Fraser Atwater, Vancouver (CA); Corey Paul Houle, Zurich (CH)

(73) Assignee: CROSSWIND POWER SYSTEMS INC., Vancouver, BC (CA)

( * ) Notice: Subject to any disclaimer, the term of this patent is extended or adjusted under 35 U.S.C. 154(b) by 84 days.

(21) Appl. No.: 13/814,476

(22) PCT Filed: May 3, 2011

(86) PCT No.: PCT/CA2011/000510
§ 371 (c)(1),
(2), (4) Date: Jul. 3, 2013

(87) PCT Pub. No.: WO2012/016319
PCT Pub. Date: Feb. 9, 2012

(65) Prior Publication Data
US 2013/0285377 A1     Oct. 31, 2013

Related U.S. Application Data

(60) Provisional application No. 61/370,865, filed on Aug. 5, 2010.

(51) Int. Cl.
| | | |
|---|---|---|
| *F03D 9/00* | (2006.01) | |
| *H02P 9/04* | (2006.01) | |
| *F03D 7/00* | (2006.01) | |

(Continued)

(52) U.S. Cl.
CPC .. *F03D 7/00* (2013.01); *F03D 5/06* (2013.01); *F03D 9/02* (2013.01); *F05B 2240/231* (2013.01); *F05B 2260/421* (2013.01);

(Continued)

(58) Field of Classification Search
USPC .............. 290/44, 55; 114/102.1, 102.16; 244/153 R, 155 A
See application file for complete search history.

(56) References Cited

U.S. PATENT DOCUMENTS 4,076,190 A * 2/1978 Lois ..................... 244/153 R
4,084,102 A * 4/1978 Fry et al. .................. 290/55

(Continued)

FOREIGN PATENT DOCUMENTS

FR       2949248 A1   2/2011
WO   2007073665 A1   7/2007

(Continued)

OTHER PUBLICATIONS

Search Report and Written Opinion mailed Aug. 15, 2011 for priority application PCT/CA2011/000510.

*Primary Examiner* — Pedro J Cuevas
(74) *Attorney, Agent, or Firm* — Troutman Sanders LLP; Ryan A. Schneider; Chris Davis

(57) ABSTRACT

The present disclosure is directed at a method and system for harnessing wind energy using a tethered airfoil. During a traction phase, wind is allowed to extend a kite tether. Wind energy that is harnessed through extension of the kite tether is mechanically stored prior to using the wind energy that is stored to generate electricity. During a retraction phase, the wind energy that is mechanically stored during the traction phase is used to retract the kite tether. Beneficially, the mechanical storage allows the kite tether to be retracted without relying on electricity from an electrical grid.

20 Claims, 13 Drawing Sheets

(51) Int. Cl.
  *F03D 5/06* (2006.01)
  *F03D 9/02* (2006.01)
  *B63H 9/04* (2006.01)
  *A63H 27/08* (2006.01)

(52) U.S. Cl.
  CPC .............. *Y02E 10/70* (2013.01); *F03D 9/002* (2013.01); *Y02E 10/72* (2013.01)

(56) References Cited

U.S. PATENT DOCUMENTS

| | | | |
|---|---|---|---|
| 4,124,182 A * | 11/1978 | Loeb | 244/153 R |
| 4,166,596 A * | 9/1979 | Mouton et al. | 244/30 |
| 4,774,855 A * | 10/1988 | Murrell et al. | 475/31 |
| 6,254,034 B1 * | 7/2001 | Carpenter | 244/153 R |
| 6,523,781 B2 * | 2/2003 | Ragner | 244/153 R |
| 6,555,931 B2 * | 4/2003 | Mizzi | 290/54 |
| 7,188,808 B1 * | 3/2007 | Olson | 244/153 R |
| 7,275,719 B2 * | 10/2007 | Olson | 244/155 A |
| 7,287,481 B1 * | 10/2007 | Wrage et al. | 114/102.29 |
| 7,504,741 B2 * | 3/2009 | Wrage et al. | 290/55 |
| 7,546,813 B2 * | 6/2009 | Wrage | 114/102.1 |
| 7,656,053 B2 * | 2/2010 | Griffith et al. | 290/44 |
| 7,672,761 B2 * | 3/2010 | Wrage et al. | 701/21 |
| 7,798,083 B2 * | 9/2010 | Wrage | 114/102.1 |
| 7,866,271 B2 * | 1/2011 | Wrage et al. | 114/102.16 |
| 7,971,545 B2 * | 7/2011 | Wrage | 114/102.18 |
| 8,056,490 B2 * | 11/2011 | Wrage | 114/39.21 |
| 8,215,588 B2 * | 7/2012 | Wrage et al. | 244/155 A |
| 8,247,912 B2 * | 8/2012 | Da Costa Duarte Pardal et al. | 290/44 |
| 8,405,244 B2 * | 3/2013 | Zhang et al. | 290/55 |
| 8,511,079 B2 * | 8/2013 | Stoltz et al. | 60/398 |
| 8,602,363 B2 * | 12/2013 | Larson | 244/155 A |
| 8,607,722 B2 * | 12/2013 | Wrage et al. | 114/39.21 |
| 8,791,585 B2 * | 7/2014 | Calverley et al. | 290/1 R |
| 2002/0040948 A1 | 4/2002 | Ragner | 244/153 R |
| 2003/0140835 A1 * | 7/2003 | Wrage | 114/102.1 |
| 2007/0157868 A1 * | 7/2007 | Wrage et al. | 114/365 |
| 2007/0228738 A1 | 10/2007 | Wrage | 290/44 |
| 2007/0250226 A1 * | 10/2007 | Wrage et al. | 701/21 |
| 2007/0261624 A1 * | 11/2007 | Wrage | 114/102.1 |
| 2007/0272141 A1 * | 11/2007 | Wrage | 114/111 |
| 2008/0115716 A1 * | 5/2008 | Wrage | 114/343 |
| 2009/0071388 A1 * | 3/2009 | Wrage | 114/102.18 |
| 2009/0212574 A1 * | 8/2009 | Wrage | 290/54 |
| 2009/0266283 A1 * | 10/2009 | Wrage et al. | 114/102.12 |
| 2009/0278353 A1 * | 11/2009 | Da Costa Duarte Pardal et al. | 290/44 |
| 2010/0192825 A1 * | 8/2010 | Wrage | 114/102.16 |
| 2010/0230968 A1 | 9/2010 | Chernyshov | 290/44 |
| 2011/0142632 A1 | 6/2011 | Stoltz et al. | 416/36 |
| 2011/0266809 A1 | 11/2011 | Calverley | 290/55 |
| 2013/0154275 A1 | 6/2013 | Calverley et al. | 290/1 A |
| 2013/0307274 A1 * | 11/2013 | Sia | 290/55 |
| 2015/0008678 A1 * | 1/2015 | Goldstein | 290/55 |

FOREIGN PATENT DOCUMENTS

| | | |
|---|---|---|
| WO | 2010017630 A1 | 2/2010 |
| WO | 2010053389 A2 | 5/2010 |

* cited by examiner

Pitch Line

Steering Lines

METHOD AND SYSTEM FOR HARNESSING WIND ENERGY USING A TETHERED AIRFOIL

CROSS-REFERENCE TO RELATED APPLICATIONS

This application is a US National Stage of International Application No. PCT/CA2011/000510, filed 3 May 2011, which claims the benefit of US Provisional Patent Application No. 61/370,865, filed 5 Aug. 2010, both herein fully incorporated by reference.

TECHNICAL FIELD

The present disclosure is directed at a method and system for harnessing wind energy using a tethered airfoil.

BACKGROUND

There exists a growing need for environmentally friendly and renewable energy sources. This growing need results at least in part from increasing worldwide energy demands and environmental awareness, and a decreasing supply of readily accessible fossil fuels. One environmentally friendly and renewable energy source is the wind.

One way in which wind energy can be harnessed is by using a pumping kite generator. Research continues into solving technical problems associated with pumping kite generators.

BRIEF DESCRIPTION OF THE DRAWINGS

In the accompanying drawings, which illustrate one or more exemplary embodiments.

SUMMARY

Figure 1:
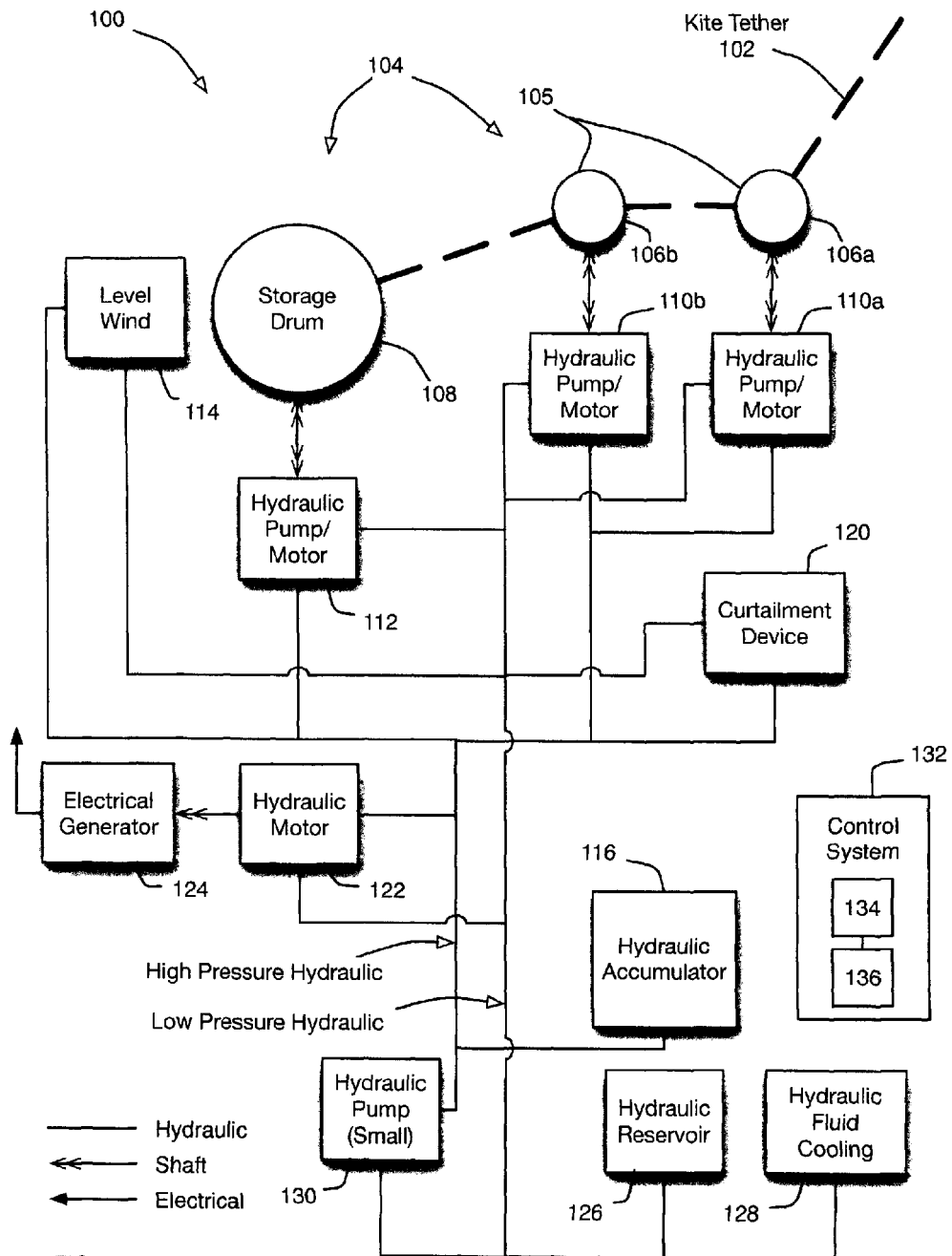
FIG. 1 depicts a system for harnessing wind energy using a tethered airfoil according to a first embodiment utilizing a winching device, which includes a storage drum and a double capstan, to apply tension to and relieve tension from a kite tether.

According to a first aspect, there is provided a method for harnessing wind energy using a tethered airfoil. The method can include, during a traction phase, allowing wind to extend a kite tether and mechanically storing wind energy harnessed through extension of the kite tether prior to using the wind energy that is stored to generate electricity; and during a retraction phase, using at least a portion of the wind energy mechanically stored during the traction phase to retract the kite tether.

Mechanically storing the wind energy may be done using an accumulator. Electricity may be generated using the wind energy harnessed during the traction phase. The electricity may be generated using at least a portion of the wind energy mechanically stored during the traction phase. The electricity may be generated during the retraction phase. The electricity may be generated at a power level that is constant; alternatively, the electricity may be generated at a power level that varies with electrical load to be satisfied by a utility.

During the traction phase, it may be determined whether the wind energy being harnessed during the current traction phase is sufficient to generate the electricity at a certain power threshold. When the wind energy is insufficient to generate the electricity at the certain power threshold, at least a portion of the wind energy that is mechanically stored during the current or a previous traction phase can be used to supplement the wind energy being harnessed such that the electricity is generated at the certain power threshold.

Additionally or in the alternative to the foregoing aspects, during the traction phase, it may be determined whether the wind energy being harnessed during the current traction phase exceeds that used to generate the electricity at the certain power threshold. When the wind energy being harnessed exceeds that needed to generate the electricity at the certain power threshold, the wind energy in excess of that used to generate the electricity at the certain power threshold may be mechanically stored.

Additionally or in the alternative to the foregoing aspects, it may be determined whether available wind energy, which includes the wind energy that is being harnessed during the current traction phase and the wind energy mechanically stored during the current or a previous traction phase is sufficient to generate the electricity at the certain power threshold. When the available wind energy is insufficient to generate the electricity at the certain power threshold, a dispatchable generator may be used to supplement the available wind energy such that the electricity is generated at the certain power threshold.

Additionally or in alternative to the foregoing aspects, it may be determined whether sufficient storage capacity exists to mechanically store the wind energy being harnessed during the current traction phase. When insufficient storage capacity exists to mechanically store the wind energy being harnessed, the wind energy that cannot be stored may be dissipated. Dissipation can occur through a curtailment device that performs useful work with the energy, or by venting energy using a pressure relief valve.

A variable displacement hydraulic pump/motor can be mechanically coupled to the kite tether and extension and retraction of the kite tether can be controlled by adjusting per-cycle displacement of the variable displacement hydraulic pump/motor. For example, when a hydraulic circuit is used to harness wind energy, during the traction phase the product of hydraulic fluid flow rate and hydraulic pressure in the hydraulic circuit may be maximized in order to maximize the amount of wind energy that is harnessed using the kite. Analogously, during the retraction phase, the product of hydraulic fluid flow rate and hydraulic pressure in the hydraulic circuit may be minimized in order to minimize the amount of power utilized to retract the kite tether.

At least three kite tethers, comprising two steering tethers and a pitch tether, can be coupled between the tethered airfoil and a ground station. Alternatively, an airborne kite control unit can be coupled to the tethered airfoil by at least three kite tethers comprising two steering tethers and a pitch tether, and the kite control unit can be coupled to a ground station using an additional kite tether.

The tethered airfoil may also be steered. The tethered airfoil can be steered towards one of the steering tethers by changing the relative lengths of the steering tethers. Additionally or alternatively, the angle of attack of the tethered airfoil can be adjusted by adjusting the length of the pitch tether relative to the steering tethers.

According to another aspect, there is provided a system for harnessing wind energy using a tethered airfoil. The system includes an airfoil; a tether coupled to the airfoil; a winching device around which the tether is wrapped, the winching device configured to allow the tether to extend during a traction phase and to retract the tether during a retraction phase; an accumulator configured to store harnessed wind energy; a winching device hydraulic pump/motor mechanically coupled to the winching device and hydraulically coupled to the accumulator, the winching device hydraulic pump/motor configured to convert the harnessed wind energy stored in the accumulator to actuate the winching device to retract the tether during the retraction phase, and to transfer the harnessed wind energy harnessed via extension of the tether from the winching device to the accumulator for storage during the traction phase; and a control system communicatively coupled to the winching device hydraulic pump/motor and the accumulator. The control system may be configured to perform a method, which includes during the traction phase, allowing wind to extend the tether and storing in the accumulator the harnessed wind energy prior to using the harnessed wind energy to generate electricity; and during the retraction phase, using at least a portion of the harnessed wind energy stored in the accumulator to retract the tether.

The system may include a hydraulic motor hydraulically coupled to the accumulator and to the winching device hydraulic pump/motor; and an electrical generator mechanically coupled to the hydraulic motor; if so, electricity may be generated using the harnessed wind energy. Electricity may be generated using at least a portion of the harnessed wind energy stored in the accumulator. Electricity may also be generated during the retraction phase. Electricity may be generated at a power level that is constant; alternatively, electricity may be generated at a power level that varies with electrical load to be satisfied by a utility.

The method performed by the control system may also include determining, during the traction phase, whether the wind energy being harnessed during the current traction phase is sufficient to generate the electricity at a certain power threshold. When the wind energy being harnessed is insufficient to generate the electricity at the certain power threshold, the harnessed wind energy stored in the accumulator may be used to supplement the wind energy being harnessed such that the electricity is generated at the certain power threshold.

Additionally or in alternative to the foregoing aspects, the method performed by the control system may also include determining, during the traction phase, whether the wind energy being harnessed during the current traction phase exceeds that used to generate the electricity at the certain power threshold. When the wind energy being harnessed exceeds that used to generate the electricity at the certain power threshold, the wind energy in excess of that used to generate the electricity at the certain power threshold may be stored in the accumulator.

Additionally or in alternative to the foregoing aspects, the method performed by the control system may also include determining whether available wind energy, which includes the wind energy being harnessed during the current traction phase and the harnessed wind energy stored in the accumulator, is sufficient to generate the electricity at the certain power threshold. When the available wind energy is insufficient to generate the electricity at the certain power threshold, a dispatchable generator may be used to supplement the available wind energy such that the electricity is generated at the certain power threshold.

Any of the foregoing aspects of the system may include a curtailment device that is hydraulically coupled to the winching device hydraulic pump/motor. The curtailment device can be used to dissipate energy from the system by performing useful work with the energy. When the curtailment device is present, the method performed by the control system may also include determining whether the accumulator has sufficient storage capacity to store the wind energy being harnessed during the current traction phase; and when the accumulator has insufficient storage capacity to store the wind energy being harnessed, dissipating the wind energy being harnessed that cannot be stored using the curtailment device.

Any of the foregoing aspects of the system may also include an engine mechanically coupled between the electrical generator and the hydraulic motor. Alternatively or additionally, the system may also include an engine mechanically coupled to a genset electrical generator wherein outputs of the electrical generator and the genset electrical generator are electrically coupled together. Alternatively or additionally, the system may include an engine and a hydraulic pump mechanically coupled to the engine and hydraulically coupled to the accumulator.

Any of the foregoing aspects of the system may include a plurality of ground station modules disposed remotely from and hydraulically coupled to a generation module. Each of the ground station modules can include the airfoil, the tether, the winching device, and the winching device hydraulic pump/motor. The generation module may include the accumulator, the hydraulic motor, and the electrical generator.

Alternatively or additionally, any of the foregoing aspects of the system may include a plurality of ground station modules disposed remotely from and electrically coupled to an electrical control module. Each of the ground station modules may include the airfoil, the tether, the winching device, the accumulator, the winching device hydraulic pump/motor, the hydraulic motor, and the electrical generator. The electrical control module may include a switching network such that any one of the ground station modules can be electrically coupled to any one or more of the other ground station modules.

The winching device hydraulic pump/motor in any of the foregoing aspects of the system may be a variable displacement hydraulic pump/motor.

The system may also include at least three kite tethers, comprising two steering tethers and a pitch tether, which are coupled to the airfoil, and the traction winch can include three winch drums, each of which has wrapped thereon one of the tethers.

The system may also include a kite control unit that is airborne when the wind energy is being harnessed; and at least three kite tethers, comprising two steering tethers and a pitch tether, that couple the kite control unit to the airfoil. The additional kite tether can couple the kite control unit to the winching device.

A differential line actuator may be coupled between the traction winch and the airfoil, and may be configured to adjust the lengths of the steering tethers relative to each other and the length of the pitch tether relative to the steering tethers. The differential line actuator may include a reference table; a movable table movable relative to the reference table along a longitudinal axis; and movable steering tether sheaves mounted on the movable table. The movable steering tether sheaves may each be longitudinally movable relative to the movable table.

According to another aspect, there is provided a computer readable medium having encoded thereon statements and instructions to cause a controller to execute any of the foregoing aspects of the method.

According to another aspect, there is provided a system for harnessing wind energy using a tethered airfoil. The system includes a controller and a computer readable medium communicatively coupled to the controller that has encoded thereon statements and instructions to cause the controller to execute any of the foregoing aspects of the method.

DETAILED DESCRIPTION

Directional terms such as "top", "bottom", "upwards", "downwards", "vertically" and "horizontally" are used in the following description for the purpose of providing relative reference only, and are not intended to suggest any limitations on how any apparatus is to be positioned during use, or to be mounted in an assembly or relative to an environment.

An apparatus known as a "pumping kite generator" can be used to harness wind energy. The pumping kite generator is composed of a ground station and of an airfoil that is attached to a tether. An airfoil includes any controllable device that flies due to the wind and that has the ability to produce varying tether tension as a result of aerodynamic forces. At the ground station, the tether is coupled, through a winching device around which the tether is wound and other elements used to transfer harnessed wind energy, to an electrical generator that forms part of the ground station. When the airfoil is travelling away from the ground station, the tether unspools from the winching device, consequently transferring mechanical energy to the electrical generator, which then generates electricity. In order to produce useful work, the airfoil is flown at a low angle, downwind of the ground station, and achieves an airspeed proportional to its aerodynamic efficiency. This high airspeed over the surface of the airfoil creates a force that pulls on the tether. The tether is let out by the ground station at a rate dependent on the absolute magnitude of the wind speed and the physical limitations of the pumping kite generator. The linear motion of the tether is transformed into rotational motion by allowing it to roll off of the winching device. Energy harnessed via the winching device is then transferred to the electrical generator, which converts the mechanical energy into electrical energy. When the tether is being pulled off the winching device and the pumping kite generator is generating electricity, the pumping kite generator is operating in the "traction phase". Eventually, the tether will extend to its maximum length. At this point, the airfoil is brought closer to the ground station. To accomplish this, a control system alters one or both of the shape and the angle of attack of the airfoil to decrease the level of lift it produces and activates the winching device such that the tether is retracted by a certain amount; while the tether is being retracted, the pumping kite generator is operating in the "retraction phase". During the retraction phase, the airfoil is not converting wind energy into electrical energy; instead, energy is being used to bring the airfoil closer to the ground station. Following retraction, the pumping kite generator can again undergo one of the traction phases in order to harness more wind energy.

Several problems are encountered when electricity is generated using the pumping kite generator. For example, one problem is how to efficiently convert the linear, oscillating mechanical input provided by the tether into electricity, and how to create the linear, oscillating mechanical output that is applied to the tether.

Another problem is how to generate electricity in such a way that it is relatively economically valuable to an electrical utility. Electrical generation that is relatively valuable to a utility is that which can track the electrical loads that the utility must satisfy; this type of generation is referred to as "load following" generation. Electrical generation that is not relatively valuable is that which is unpredictably variable. Unfortunately, several factors inherently make electricity generation using the pumping kite generator variable. For example, the pumping kite generator undergoes repeated traction and retraction phases, during the latter of which wind power is not being harnessed. Additionally, wind itself is inherently variable, and alternates from periods of no wind to gusts of very high wind.

A further problem is that electricity delivered to the electrical utility should be maintained at a specified voltage, frequency and phase. Because wind power is inherently variable, conventional wind power plants have difficulty meeting these standards. Conventional wind power plants can utilize power electronics to provide very short term smoothing of variations in generated electricity so as to prevent an electrical grid from destabilizing, but the power electronics are typically unable to practically provide consistent power output. Furthermore, the power electronics are quite expensive, thereby effectively increasing the cost of electricity generation.

The embodiments described herein are directed at a method and system for harnessing wind energy using a pumping kite that utilizes hydraulic transmission to store wind energy, to use the stored wind energy to generate electricity even during the retraction phase, and that does so without using the relatively expensive power electronics found in many conventional wind power plants. The "kite" is composed of components including the airfoil and, in one embodiment, a kite control unit that can alter the shape and angle of attack of the airfoil. The kite is referred to as a "pumping" kite because of the type of motion it assumes when it repeatedly experiences the traction and retraction phases.

Referring now to FIG. 1, there is depicted a system 100 for harnessing wind power using a pumping kite, according to a first embodiment. The system 100 includes a kite airfoil (not shown in FIGS. 1 through 6, but labelled 703 in FIG. 7) that is coupled to a tether 102 that extends between the ground and the airfoil. The tether 102 is coupled to a winching device 104 that, in this embodiment, is composed of a storage drum 108 and a double capstan 105 (also known as a friction winder) that has first and second drums 106a, 106b; as discussed in further detail below, in alternative embodiments the winching device 104 may be alternatively constructed. Relative to the airfoil, the tether 102 first wraps around the double capstan 105 and then the storage drum 108. The double capstan 105 may, for example, be constructed using one or more independently driven pulleys; the longitudinal axis of the pulleys may be aligned horizontally or vertically, and one or more of the pulleys may be stacked. Each of the storage drum 108 and the first and second drums 106a, 106b is mechanically coupled via a shaft to its own variable displacement hydraulic pump/motor; the first drum 106a is coupled to a first drum pump/motor 110a, the second drum 106b is coupled to a second drum pump/motor 110b, and the storage drum 108 is coupled to a storage drum pump/motor 112; collectively, the pump/motors 110a, 110b, 112 are referred to as a winching device hydraulic pump/motor. As discussed in further detail below, each of the pump/motors 110a, 110b, 112 operates as a hydraulic pump to store wind energy when the pumping kite generator is operating in the traction phase, and uses stored wind energy to retract the airfoil when the pumping kite generator is operating in the retraction phase. Additionally, the storage drum 108 acts as a spool to store the tether 102. While the storage drum pump/motor 112 facilitates this by rotating the storage drum 108 about its longitudinal axis, a level-wind 114 reciprocally actuates parallel to the longitudinal axis to evenly distribute the tether 102 along the length of the storage drum 108. While in the depicted embodiment the level-wind 114 is hydraulically powered, in an alternative embodiment (not depicted) the level-wind 114 is alternatively suitably powered, such as electrically or pneumatically. The first and second drums 106a, 106b apply the force to the tether 102 to control its extension. The double capstan 105 and the storage drum 108 work in conjunction to maintain appropriate tension on the tether 102 such that the tether 102 can be properly wound on the storage drum 108.

Each of the pump/motors 110a, 110b, 112 is hydraulically coupled to an accumulator 116 that stores wind energy as mechanical energy. For example, during the traction phase, the first and second drums 106a, 106b and the storage drum 108 are rotated by virtue of the unspooling tether 102. The shafts coupled to each of the first and second drums 106a, 106b and the storage drum 108 consequently rotate and cause the pump/motors 110a, 110b, 112 to pump hydraulic fluid into the accumulator 116. The accumulator 116 consequently stores energy in the form of compressed, high pressure gas. The wind energy that is stored in the accumulator is stored prior to being used to generate electricity. Some of the wind energy that is harnessed may be simultaneously stored in the accumulator 116 prior to being used to generate electricity, and some may be used to generate electricity immediately without first being mechanically stored.

Should energy supply exceed demand and if the accumulator 116 has no remaining storage capacity, the hydraulic fluid pumped by the pump/motors 110a, 110b, 112 can be diverted to a curtailment device 120. The curtailment device 120 dissipates from the system 100 excess energy that cannot be stored by performing useful work with the excess energy. For example, the curtailment device 120 may be used for any one or more of heating; to generate unregulated electricity; to pump water; to desalinate water through reverse osmosis; to generate hydrogen from electrolysis; to compress gas for storage or use in industrial processes; to pump fluids for industrial purposes; and applications related to biofuels (e.g.: to circulate or aerate algae tanks). Alternatively, a pressure relief valve (not shown) can be used to dissipate excess energy from the system 100.

Each of the pump/motors 110a, 110b, 112, the level-wind 114, and the curtailment device 120 are components that are disposed along and form part of a hydraulic circuit that has a "high pressure side" and a "low pressure side"; each of the components that are disposed along and form part of the hydraulic circuit is a "hydraulic element". The high pressure side of the hydraulic circuit terminates at the accumulator 116, while the low pressure side of the hydraulic circuit terminates at a hydraulic reservoir 126 that supplies the hydraulic fluid used by the hydraulic elements. The system 100 also includes a hydraulic fluid cooling unit 128 in order to maintain proper operating temperature of the hydraulic fluid; and a charging pump 130 that can be used to build up pressure in the system 100 when the system pressure is too low, for example after a long-term shutdown. Although one accumulator 116 is shown coupled to the hydraulic circuit in FIG. 1, in alternative embodiments (not depicted) multiple accumulators 116 can be coupled to the hydraulic circuit to increase storage capacity.

Energy from the high pressure side of the hydraulic circuit is used to generate electricity using a hydraulic motor 122, which is also one of the hydraulic elements, that is disposed along the hydraulic circuit. The hydraulic motor 122 may be, for example, an axial piston or other suitable variable displacement hydraulic motor. Energy from the high pressure side of the hydraulic circuit is used to power the hydraulic motor 122, which rotates a shaft that mechanically couples the hydraulic motor 122 to an electrical generator 124. The electrical generator thereby generates electricity.

The system 100 includes a control system 132 configured to control operation of the system 100. Although not depicted in FIG. 1, the control system 132 is communicatively coupled to each of the hydraulic elements. The control system 132 may include, for example, a controller 134 that is communicatively coupled to a memory 136 that has encoded thereon statements and instructions for causing the controller 134 to control the system 100 such that the system 100 harnesses wind energy using the pumping kite.

As the system 100 includes a storage element in the form of the accumulator 116, to the extent provided by the storage capacity of the accumulator 116 the system 100 is able to generate a stable, constant level of electricity at a certain power threshold regardless of the current operating mode of the system 100. For example, during the retraction phase when no wind power is being harnessed, the accumulator 116 nonetheless supplies energy to the hydraulic motor 122 that is used to generate electricity. The accumulator 116 also supplies the energy used to retract the tether 102, and consequently eliminates the need for an alternative energy source to retract the tether 102 such as batteries, which are expensive and not well suited to the frequent charge/discharge cycles they would encounter during typical operation of the system 100, or a fossil fuel generator. Furthermore, if at any time the wind energy being harnessed exceeds the amount needed to meet the utility's electricity requirements, the utility's electricity requirements can be met while storing excess wind energy in the accumulator 116 for future use.

Because of the fast response time of the system 100, the system 100 is able to operate to output both a constant level of electricity at the certain power threshold, as described above, and also to "load follow" demands that may be placed on the utility to the extent allowed by the storage capacity of the accumulator 116. In other words, the system 100 is able to act as a semi-dispatchable generator. For example, during peak electricity usage hours, the electricity load that the utility has to satisfy may suddenly spike by 10%; in response to a signal from the utility, the system 100 is able to very quickly divert extra energy from the accumulator 116 to the hydraulic motor 122 in order to accordingly increase electricity generation. This is in stark contrast to generators such as nuclear and coal power plants, which are typically unable to load follow and are therefore used primarily to satisfy base electrical loads. This is also in contrast to gas generators, which can load follow but that do so by burning fossil fuels to produce environmentally unfriendly and relatively expensive energy, and to other sources of renewable energy such as conventional solar and wind generators in which there is no or very limited dispatchability.

Beneficially, by using at least a portion of the energy stored in the accumulator 116 to retract the tether 102 during the retraction phase, the tether 102 can be retracted without utilizing electricity from the utility. This is beneficial in that the system 100 does not act as an electrical load on the utility, even during the retraction phase. If the system 100 required electricity from the utility to retract the tether 102, the utility would undesirably have to use some of its own generation capacity, and potentially some of its valuable "load following" generation capacity, to retract the tether 102.

The control system 132 takes into account several variables during operation of the system 100. For example, in order to satisfy changing power requirements from the utility, the control system 132 modifies the torque that the hydraulic motor 122 applies to the shaft that couples the hydraulic motor 122 to the electrical generator 124, while maintaining constant the rotational frequency of the shaft. The rotational frequency remains constant because the frequency of electricity supplied to the utility is to remain constant. The rotational frequency may be a function of the electrical grid frequency or may determine the electrical grid frequency, depending on mode of operation of the system 100 as discussed in more detail below. To affect the torque that the hydraulic motor 122 supplies, the control system 132 adjusts the displacement of the hydraulic motor 122.

The control system 132 also rotates the first and second drums 104a, 104b so as to prevent the tether 102 from slipping on the drums 104a, 104b, to prevent unwanted tension or slack from being introduced to the tether 102, and to facilitate harnessing of wind energy. Each time the tether 102 is wrapped around one of the drums 104a, 104b tension in the tether 102 decreases and the tether 102 consequently compresses; in order to prevent slippage, the control system 132 rotates the drums 104a, 104b at different rates. As the double capstan 105 decreases tension in the tether 102, use of the double capstan 105 can beneficially extend tether life. Additionally, when rotating the storage drum 108, the control system 132 takes into account the number of wraps of the tether 102 on the storage drum 108 to determine the rate at which to rotate the storage drum 108 to maintain tension in the tether 102; as the distance the tether 102 is from the centre of the storage drum 108 generally increases with the number of times the tether 102 is wrapped on the storage drum 108, the rate of rotation of the storage drum 108 generally decreases with the number of wraps. In one embodiment, the storage drum 102 is rotated such that it maintains constant tension in the tether 102.

During the traction phase, the control system 132 controls the speed of the first and second drums 106a, 106b in accordance with the measured wind speed. One precondition for the control system 132 to carry out the traction phase is that the wind speed is sufficient to overcome the tension applied to the tether 102 by the storage drum 108 and double capstan 105; this speed is referred to as the "cut-in speed".

If the wind exceeds the rated wind speed of the system 100, the control system 132 may perform one of several actions to prevent the system 100 from operating outside its operating parameters. For example, the control system 132 may aerodynamically derate the airfoil to decrease the efficiency at which the airfoil harnesses the wind. Alternatively, the control system 132 may increase the tether angle of the tether 102. Also alternatively, the control system 132 may fly the kite across the wind window at a non-constant speed, then let the kite hover for a short time, and then fly the kite back across the wind window at a non-constant speed.

Beneficially, the displacement of each of the pump/motors 110a, 110b, 112 can be varied to cause the product of the fluid flow rate and pressure in the hydraulic circuit to be relatively high (and, ideally, maximized) during the traction phase so as to harness a relatively high amount of wind energy using the kite. Analogously, during the retraction phase, the displacement of each of the pump/motors 110a, 110b, 112 can be varied to cause the product of the fluid flow rate and pressure to be relatively low (and, ideally, minimized) so as to utilize a relative small amount of wind energy when retracting the kite.

The control system 132 can also take into account other factors when controlling the system 100, such as projected wind power harnessed by the kite; how storage capacity in the accumulator 116 will be affected by wind speed forecasts; and projected demand for electricity. For example, when the system 100 is operating to output a constant level of power to the utility, based on energy stored in the accumulator 116 and on forecasted wind speeds the control system 132 can determine over what period of time the system 100 will be able to maintain power output. As another example, the control system 132 can, based on forecasted wind speeds, determine whether the kite should be reeled in to the ground station because of low wind speeds, storm events or other meteorological phenomenon. Additionally, the control system 132 can determine, from the marginal costs of firm power, variable power, and curtailed power, a relatively optimal manner in which to operate the system 100 so as to increase profit. The control system 132 can also communicate with one or both of the electrical utility and other generation assets (e.g.: a dispatchable generator such as a diesel generator) so that if the system 100 will be unable to satisfy its generation obligations, the control system 132 can advise the utility to call upon a different source of dispatchable generation or can call upon the difference source of dispatchable generation itself.

As discussed above, the control system 132 may operate in two modes with respect to frequency and phase of the electricity that it generates. If the system 100 is the relatively dominant generator on the electrical grid, it will determine the frequency and phase of the electricity on the grid and the control system 132 keeps the frequency and phase constant. If the system 100 is a relatively small generator on the grid, the control system 132 matches the phase and frequency of the electricity that the system 100 generates to that of the grid.

Figure 2:
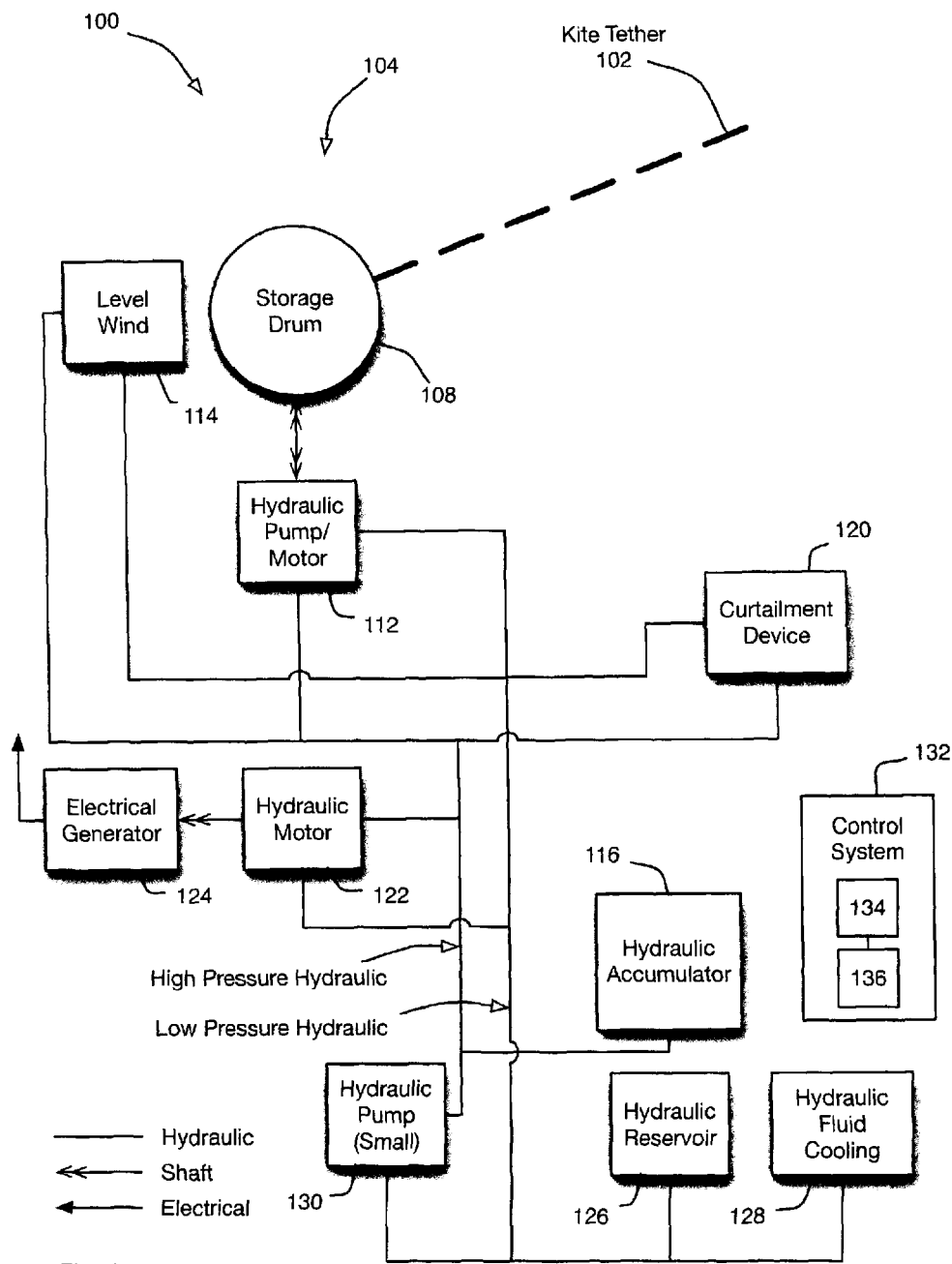
FIG. 2 depicts a system for harnessing wind energy using the tethered airfoil according to a second embodiment not utilizing the double capstan.

Referring now to FIG. 2, there is depicted another embodiment of the system 100 that is substantively similar to the embodiment of the system 100 of FIG. 1 with the difference being that the winching device 104 does not include the double capstan 105, and the winching device hydraulic pump/motor accordingly does not include the pump/motors 110a, 110b. While in FIG. 2 no capstans are used, in alternative embodiments (not depicted) a single capstan may be used, or three or more capstans may be used. In contrast to the system 100 depicted in FIG. 1 in which the presence of the first and second drums 106a, 106b means that relatively little tension is on the tether 102 at the storage drum 108, in the system 100 of FIG. 2 there is a relatively high amount of tension in the tether 102 at the storage drum 108. Consequently, if the tether 102 is wound around the storage drum 108 multiple times such that the tether 102 is wrapped over itself, the relatively high tension may force the topmost layer of the wrapped tether 102 towards the centre of the storage drum 108 and into and through other layers of the wrapped tether 102; this is known as "drum crushing", and can significantly wear the tether 102. To mitigate drum crushing, the control system 132 in FIG. 2 can operate the storage drum 108 such that the tether 102 is wrapped at most only once around the storage drum 108 immediately following any one of the retraction phases and prior to any one of the traction phases. Because the tether 102 is not wrapped over itself, drum crushing is eliminated.

Figure 3:
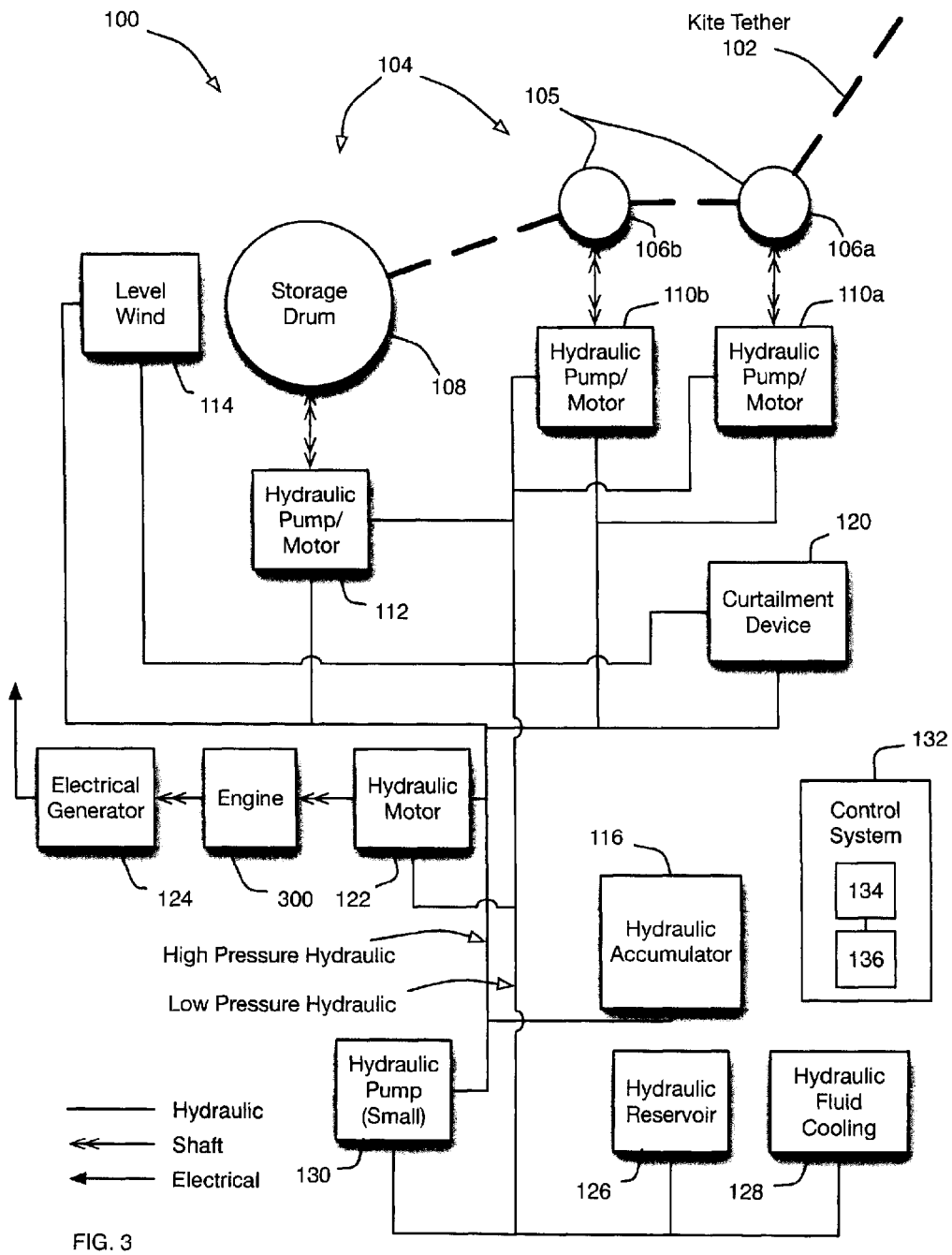
FIG. 3 depicts a system for harnessing wind energy using the tethered airfoil according to a third embodiment in which a hydraulic motor is mechanically coupled to an engine-generator ("genset") in order to generate electricity.

Referring now to FIG. 3, there is depicted an embodiment of the system 100 in which a combustion engine 300 is mechanically coupled between the hydraulic motor 122 and a genset electrical generator 124 via the shaft. The combination of the engine 300 and the genset electrical generator 124 is a "genset". Although the first and second drums 106a, 106b are shown in FIG. 3, the system 100 of FIG. 3 could also be implemented without them. The presence of the engine 300 results in a hybrid system that facilitates flexibility in system design, as the engine 300 allows the amount of storage in the accumulator 116 to be reduced without prejudicing the ability of the system 100 to generate electricity. For example, if insufficient energy is stored in the accumulator 116 to meet the electrical needs of the utility, the engine can burn fuels to supply the difference in energy needed to satisfy the utility. The presence of the engine 300 also simplifies the control algorithm used to operate the hydraulic motor 122, in that with the engine 300 there is no need to be concerned with the speed and torque output by the hydraulic motor 122 as the genset integrated control system (not shown) ensures that the speed and torque of the shaft that drives the electrical generator are adequate. Additionally, energy from the engine 300 can be used to retract the tether 102 during the retraction phase if insufficient energy remains in the accumulator 116 to do so.

In an alternative embodiment (not depicted), instead of mechanically coupling the engine 300 between the electrical generator 124 and the hydraulic motor 122, the hydraulic motor 122 and the electrical generator 124 may be directly coupled together. The engine 300 may instead be mechanically coupled to another hydraulic pump (not shown) that is in turn hydraulically coupled to the high pressure side of the hydraulic circuit. In the event that insufficient wind energy is being harnessed to satisfy the needs of the electrical utility, the engine 300 may be operated to cause the hydraulic pump to build up pressure in the hydraulic circuit, thereby increasing the amount of electricity that the electrical generator 124 can generate. In this way, electricity can be generated using both wind energy and, if desired, the fuel that powers the engine 300.

Figure 4:
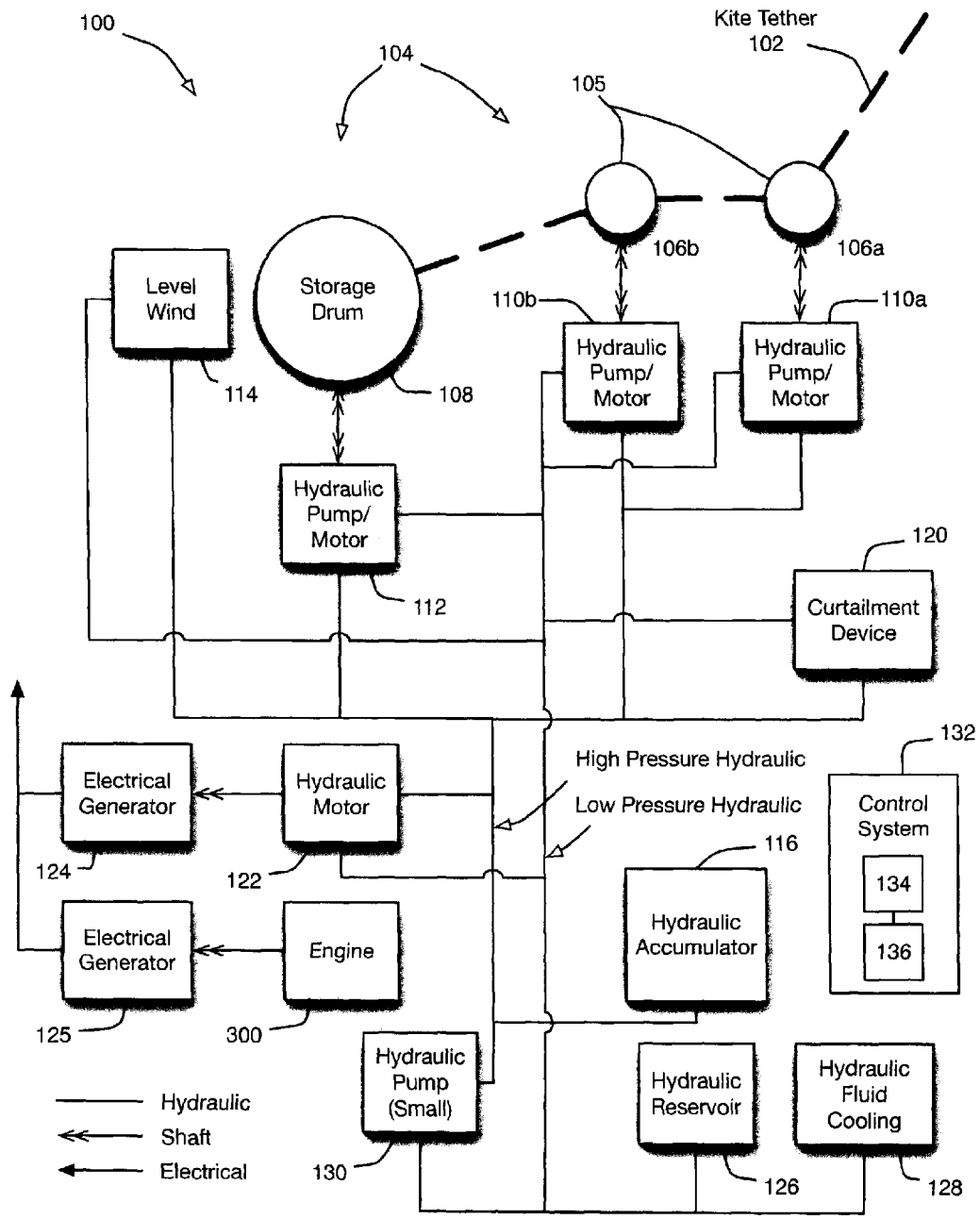
FIG. 4 depicts a system for harnessing wind energy using the tethered airfoil according to a fourth embodiment in which the hydraulic motor is mechanically coupled to a generator, which is electrically coupled to the genset.
Figure 5:
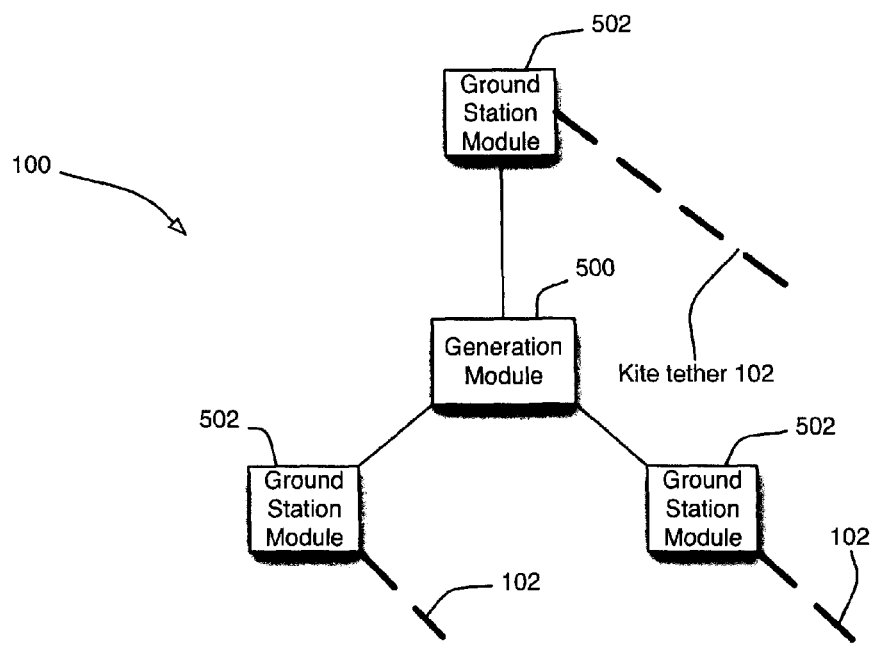
FIG. 5(a) depicts a system for harnessing wind energy using the tethered airfoil according to a fifth embodiment in which the system includes a generation module hydraulically coupled to multiple ground station modules.
FIG. 5(b) depicts one embodiment of the generation module shown in FIG. 5(a).
FIG. 5(c) depicts one embodiment of one of the ground station modules shown in FIG. 5(a).
Figure 5:
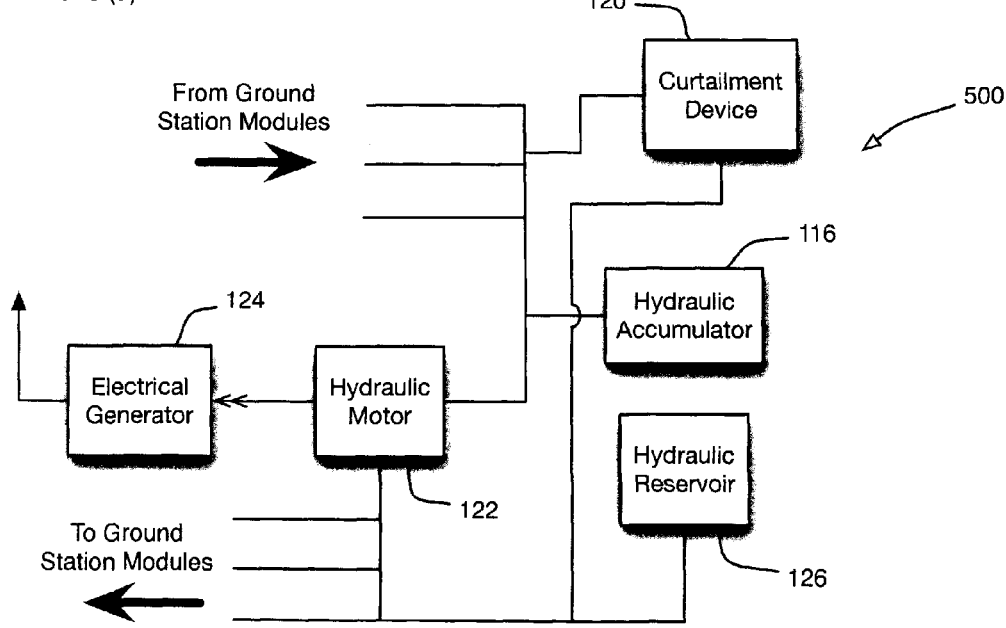
Figure 5:
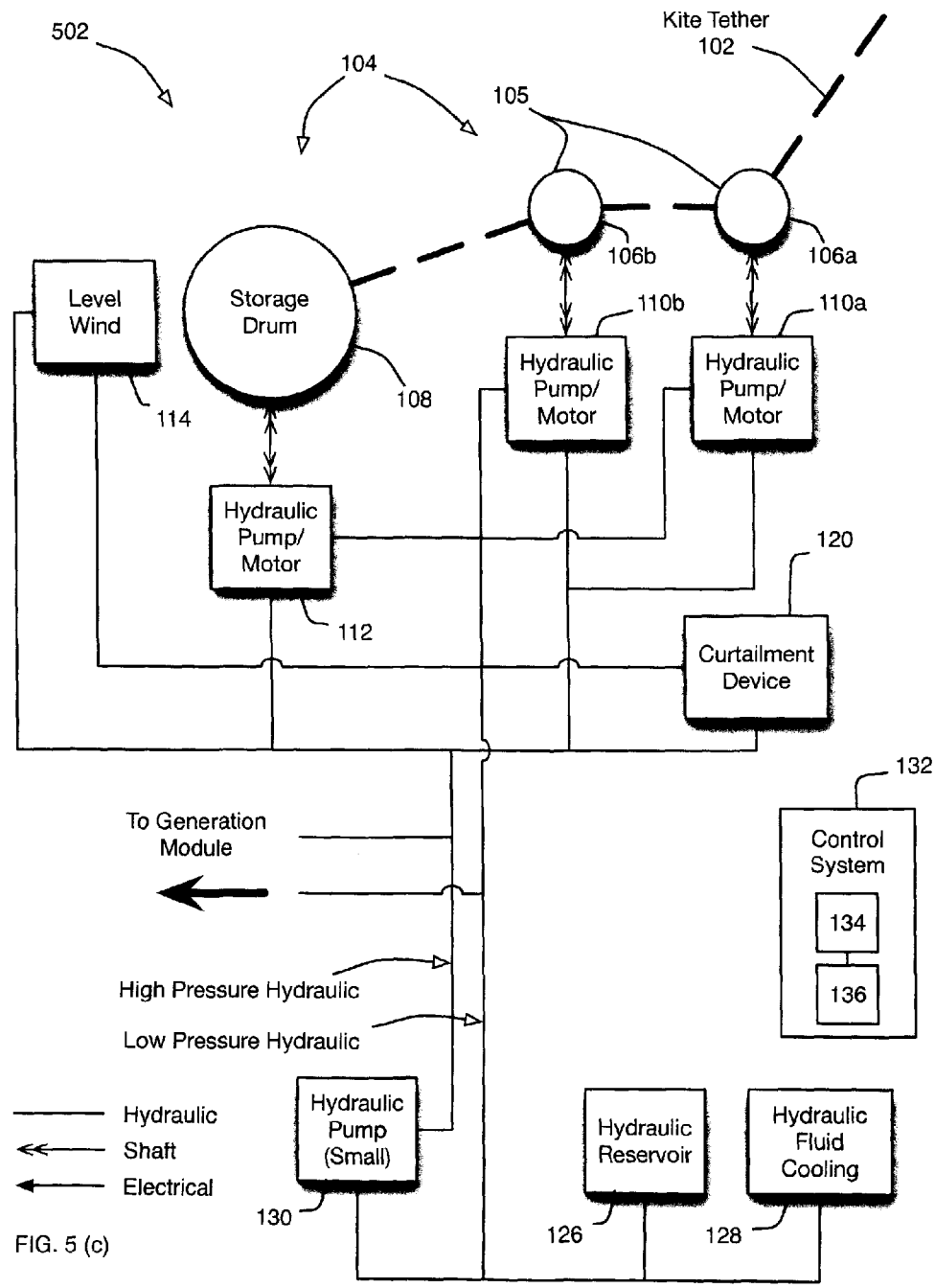
Figure 6:
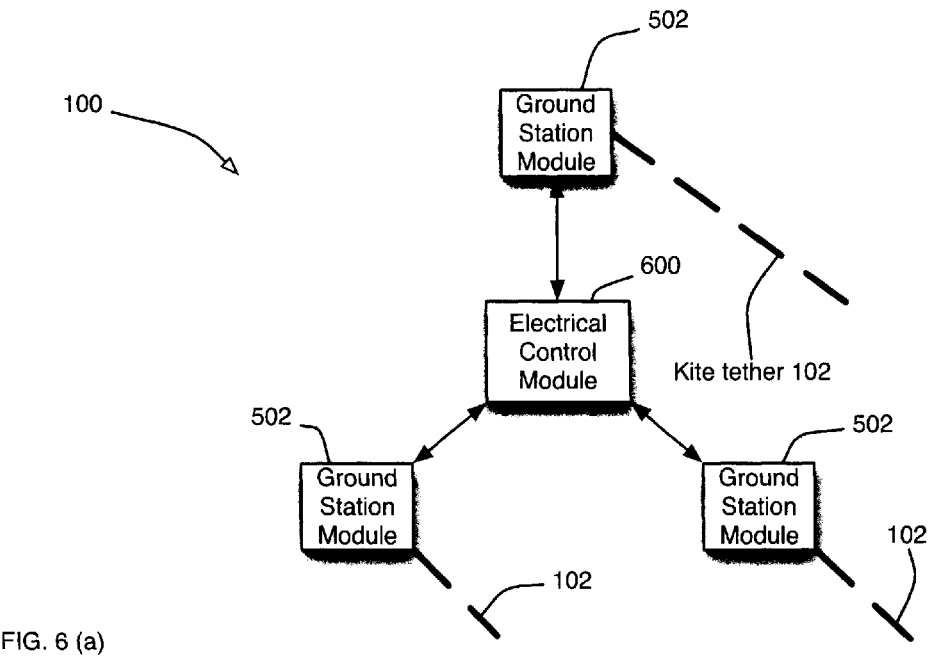
FIG. 6(a) depicts a system for harnessing wind energy using the tethered airfoil according to a sixth embodiment in which the system includes an electrical control module electrically coupled to multiple ground station modules.
FIG. 6(b) depicts one embodiment of the electrical control module shown in FIG. 6(a).
FIG. 6(c) depicts one embodiment of one of the ground station modules shown in FIG. 6(a).
Figure 6:
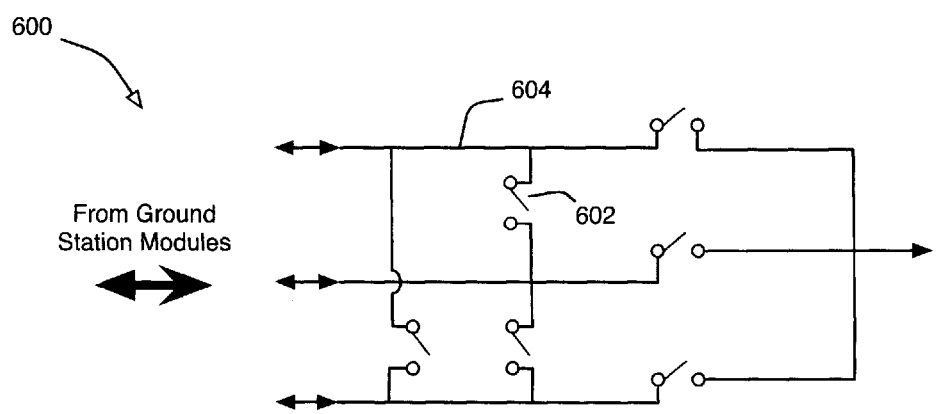
Figure 6:
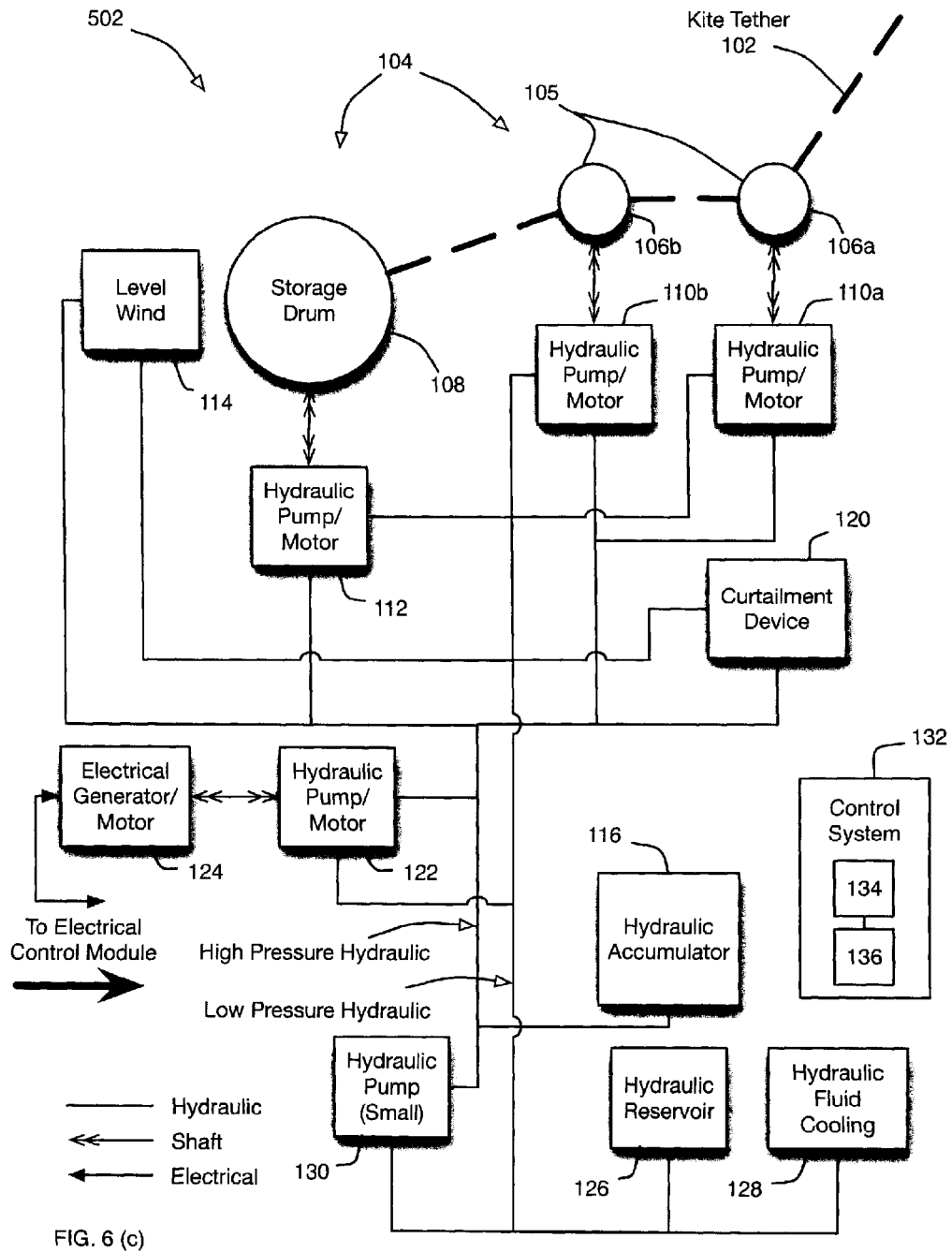

Referring now to FIG. 4, there is depicted an embodiment of the system 100 in which the engine 300 and the hydraulic motor 122 are mechanically coupled to different electrical generators, which are then electrically coupled together. The hydraulic motor 122 is mechanically coupled to the electrical generator 124, while the engine 300 is mechanically coupled to the genset electrical generator 125. Because the two electrical generators 124, 125 are still coupled, the system 100 of FIG. 4 shares the advantages of the system 100 of FIG. 3. Additionally, the system 100 of FIG. 3 is beneficial in that the electrical linking between the two electrical generators 124, 125 is typically simpler to implement than the mechanical linking between the genset and the hydraulic motor 122 shown in FIG. 3. However, in contrast to the system 100 of FIG. 3, the control system 132 cannot solely rely on the genset integrated control system to manage electricity generation, and instead directly controls the hydraulic motor 122 to ensure that the electrical generator 124 generates electricity at a frequency and power suitable for the utility. The embodiment of FIG. 3 is typically used when the kite contributes a relatively small fraction of energy to the system 100 and the engine 300 is consequently running constantly, while the embodiment of FIG. 4 is typically used when the engine 300 is used intermittently.

In the system 100 of FIGS. 3 and 4, the control system 132 has direct control over the power output of the genset, and can specifically match the output of the genset to the needs of the system 100. In contrast, in systems in which there is no genset integrated control system, the control system 132 typically does not have this level of control Referring now to FIG. 5(a), there is shown a block diagram of an array-type embodiment of the system 100 in which a generation module 500 is hydraulically coupled to multiple ground station modules 502. In the depicted embodiments, the "ground stations" depicted in FIGS. 1 through 4, 8 and 9 can be functionally divided into the ground station module 502 and the generation module 500. An embodiment of the generation module 500 is shown in FIG. 5(b), and an embodiment of one of the ground station modules 502 is shown in FIG. 5(c). In the embodiments depicted in FIGS. 1 through 4, the system elements used to retract and extend the tether 102 ("ground station elements"—e.g.: the storage drum 108, the first and second capstans 106a, 106b, and the related hydraulic pump/motors 112, 110a, 110b) are in close physical proximity to the system elements used to generate electricity ("generation elements"—e.g.: the hydraulic motor 122, the electrical generator 124, and the accumulator 116). In the embodiments of FIGS. 5(a)-(c), the generation module 500 contains the generation elements and each of the ground station modules 502 contains one set of the ground station elements. The array-type embodiment of FIG. 5(a) is advantageous in two ways. First, by having multiple ground station modules 502, multiple airfoils can be simultaneously used to generate electricity. This not only increases the total electricity generation capacity of the system 100, but the airfoils at different ground station modules 502 can be extended and retracted in complementary fashion such that the system 100 is continuously harnessing the wind. This reduces the amount of storage needed in the system 100. Second, by centrally locating the generation elements and sharing them among multiple ground station modules 502, duplication of equipment and therefore capital costs are reduced.

In FIG. 5(b), the generation elements are depicted; in the depicted embodiment, the generation elements include the curtailment device 120, the accumulator 116, the hydraulic reservoir 126, the hydraulic motor 122, and the electrical generator 124. In FIG. 5(c), the ground station elements are depicted; in the depicted embodiment, the ground station elements include the storage drum 108, the level-wind 114, the first and second capstans 106a, 106b, the hydraulic pumps/motors 110a, 110b, 112, the curtailment device 120, the charging pump 130, the hydraulic reservoir 126, and the hydraulic fluid cooling unit 128. The hydraulic pumps/motors 110a, 110b, 112 of each of the ground station modules 502 are hydraulically coupled to the hydraulic motor 122 and the accumulator 116 of the generation module 500. This allows wind energy harnessed by the ground station modules 502 to be stored in the accumulator 116 and used to power the hydraulic motor 122, and allows energy stored in the accumulator 116 to be used to retract the tether 102 of each of the ground station modules 502. Instead of using the curtailment device 120 at the ground station modules 502, the pressure relief valve can be used; installing the pressure relief valve at the ground station modules 502 can reduce piping requirements. The curtailment device 120 installed at the generation module 500 may be configured to perform useful work, such as pumping water, with curtailed energy; locating such a curtailment device at the generation module 500 advantageously allows the curtailment device 120 to utilize wind energy harnessed using any one of the ground station modules 502.

Referring now to FIG. 6(a), there is shown a block diagram of an array-type embodiment of the system 100 in which an electrical control module 600 is electrically coupled to multiple of another embodiment of the ground station modules 502. In contrast to the embodiment of the system shown in FIG. 5(a) in which multiple ground station modules 502 are hydraulically coupled together, in the embodiment of FIG. 6(a) the ground station modules 502 are electrically coupled together. As in the embodiment of FIG. 5(a), this allows wind power from multiple sites to be simultaneously or complementarily harnessed. This also allows energy generated from any one of the ground station modules 502 to be routed for use during the retraction phase in another of the ground station modules 502.

FIG. 6(b) depicts one embodiment of the electrical control module 600. In the depicted embodiment, storage is not centrally located; instead, the electrical control module 600 is composed of multiple electrical conduits 604 interconnected by switches 602. The switches are configured such that any one of the electrical conduits 604 can be electrically coupled to any other of the electrical conduits 604; as each of the ground modules 502 is electrically coupled to one of the electrical conduits 604, the electrical control module 600 allows any one of the ground station modules 502 to be electrically coupled to any one or more of the other ground station modules 502. Consequently, when one of the ground station modules 502 is in the traction phase and harnessing wind power, instead of storing this energy it may be diverted to and used by any one or more of the other ground station modules 502 that is in the retraction phase. Wind power generated by any one of the ground station modules 502 may also be stored in the accumulator 116 of any of the other ground station modules 502; this is useful if the accumulator 116 of one of the ground station modules 502 has no more storage space but the accumulator 116 of another of the ground station modules 502 has capacity. In an alternative embodiment (not depicted), a very large hydraulic accumulator can be hydraulically coupled to each of the ground station modules 502 and can be used to store energy.

FIG. 6(c) depicts on embodiment of the ground station module 502 used in the array-type embodiment depicted in FIG. 6(a). The embodiment of FIG. 6(c) is substantively similar to the system 100 depicted in FIG. 1, with the difference being that the output of the electrical generator 124 is electrically coupled to the electrical control module 600 instead of directly to the electrical utility. When the ground station module 502 receives electrical energy from one of the other ground station modules 502, the electrical generator 124 acts as a motor to convert received electrical energy into mechanical energy that powers the hydraulic motor 122 and that results in energy being transferred to the accumulator 116. Because storage capacity can be shared among the ground station modules 502, this can allow the accumulators 116 at each of the ground station modules 502 to be made smaller than they otherwise would be.

While the depicted generation module 500 and ground station modules 502 are derived from the embodiment of the system 100 depicted in FIG. 1, in alternative embodiments (not depicted), the embodiments of the system 100 as shown in any of FIGS. 2 through 4 may be analogously adapted to form the array-type embodiment shown in FIGS. 5(a)-(c) and 6(a)-(c). In another alternative embodiment (not depicted), multiple airfoils may each be coupled a tether that terminates at a general ground station. Each of the tethers is directed through a series of sheaves such that they points from which each leaves the ground is physically separated.

Figure 7:
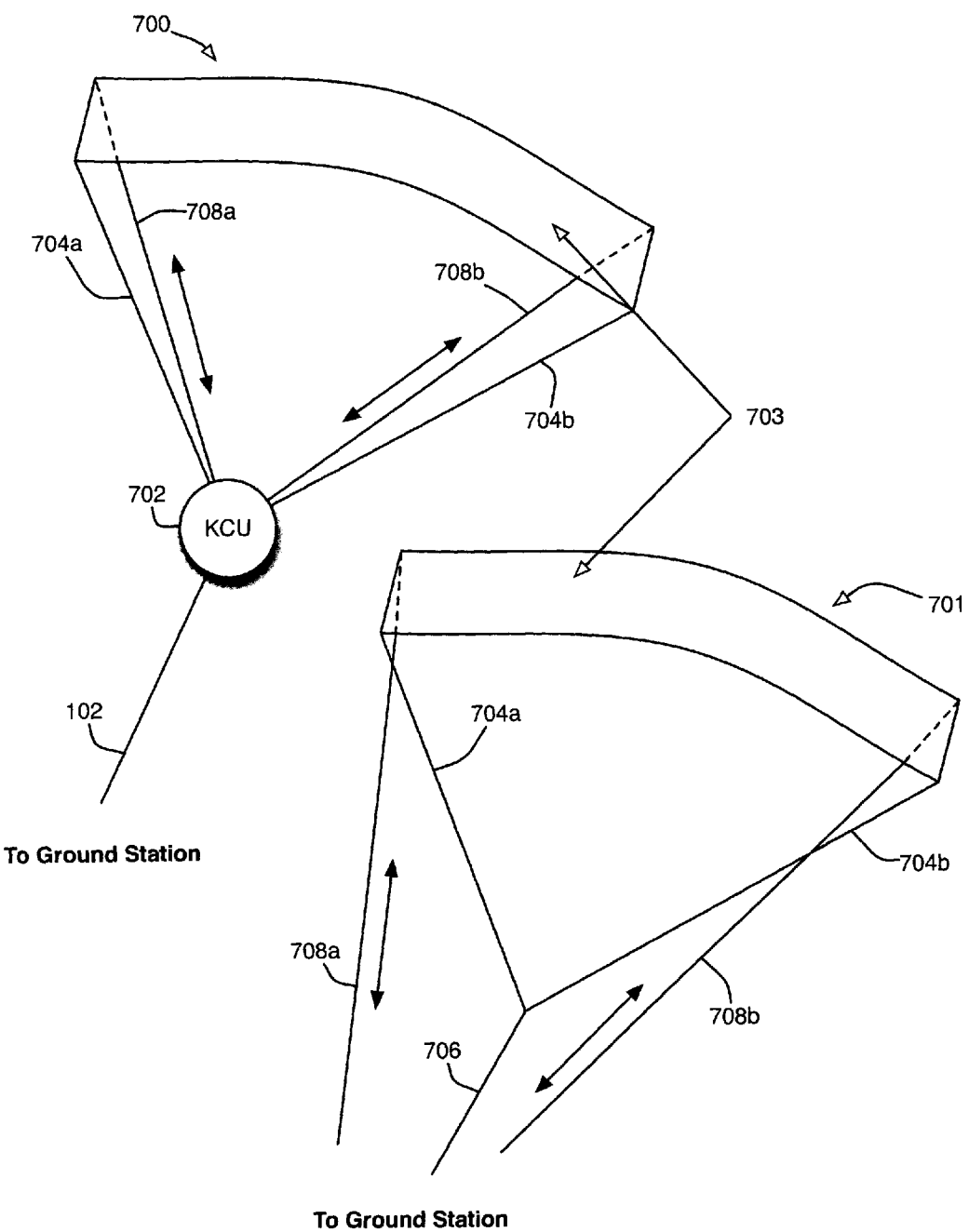
FIG. 7 depicts two embodiments of the tethered airfoil that can be used to harness wind energy.

Referring now to FIG. 7, there are depicted two configurations of the airfoil 703 that can be used with the system 100 for harnessing wind power. One configuration is hereinafter referred to as the kite control unit ("KCU") configuration 700, while the other configuration is hereinafter referred to as the 3-line configuration 701. The KCU configuration 700 is used in conjunction with the embodiments of the system 100 depicted in FIGS. 1 to 6, above. The KCU configuration 700 is a "two element" system in which both the airfoil 703 (one element) and a KCU 702 (the other element) are in the air when the system 100 is being used. The KCU 702 is connected to any of the ground stations depicted in FIGS. 1 to 4, and to any of the ground station modules depicted in FIGS. 5(c) and 6(c), via the tether 102; the KCU 702 is also connected to the airfoil 703 using a right pitch tether 704a and a left pitch tether 704b (collectively, "pitch tethers 704"), and a right steering tether 708a and a left steering tether 708b (collectively, "steering tethers 708"). The tether 102 is an additional kite tether over and above the pitch and steering tethers 704, 708. The KCU 702 itself includes mechanical systems (not shown) used to adjust the tension on the pitch and steering tethers 704 and 708, and a communications system (not shown) used to communicate with the ground stations and ground station modules, as appropriate. Communication may be performed wired or wirelessly, and when communication is performed using wires the wires may be embedded within the tether 102.

The KCU 702 is able to both steer and adjust the angle of attack of the airfoil 703. In order to steer the airfoil 703, the KCU 702 adjusts the relative length of the steering tethers 708. For example, in order to steer the airfoil 703 towards the right steering tether 708a, the KCU 702 shortens the right steering tether 708a relative to the left steering tether 708b. The KCU 702 similarly shortens the left steering tether 708b relative to the right steering tether 708a if the airfoil 703 is to be steered towards the left steering tether 708b. In order to adjust the angle of attack of the airfoil 703, the KCU 702 simultaneously adjusts the lengths of the pitch tethers 704 relative to the steering tethers 708. Assuming that the airfoil 703 is flying towards the pitch tethers 704, as the pitch tethers 704 shorten relative to the steering tethers 708 the angle of attack decreases; similarly, as the pitch tethers 704 lengthen relative to the steering tethers 708, the angle of attack increases. In this way the airfoil 703 can be steered and controlled from the ground. Although in the depicted embodiment the lengths of both of the pitch tethers 704 are simultaneously adjusted, in an alternative embodiment (not depicted) the KCU 702 may adjust the relative length between the pitch tethers 704.

The 3-line configuration 701 is a "one element" system in which the airfoil 703, and not the KCU 702, is airborne while wind energy is being harnessed. As with the KCU configuration 700, the airfoil 703 has attached to it the steering tethers 708 and the pitch tethers 704, which operate to steer and change the angle of attack of the airfoil 703 in the same way as in the KCU configuration 700. However, in the 3-line configuration 701 the right and left pitch tethers 704a,b merge to form a unified pitch tether 706. The unified pitch tether 706 and the two steering tethers 708 extend all the way to the ground station or ground station module where their relative lengths are adjusted using systems and apparatuses such as those described in FIGS. 8 to 10(c), below. Beneficially, merging the right and left pitch tethers 704a,b into the single, unified pitch tether 706 increases energy efficiency, since having only the unified pitch tether 706 extend to the ground results in less drag than having the two right and left pitch tethers 704a,b extend to the ground.

In alternative embodiments (not depicted), steering and adjusting the angle of attack of the airfoil 703 may be performed in different ways. For example, the shape of the airfoil 703 may be deformed or twisted; alternatively, the airfoil 703 may be controlled by using moving control surfaces, such as surfaces akin to ailerons used on an airplane, or by shifting different masses located on the airfoil 703. Any actuators used for such deformation or shifting can be housed within the volume of the airfoil 703 and can be actuated against the rigid or semi-rigid structure of the airfoil 703. In another alternative embodiment (not shown), the KCU 702 may be integrated within the airfoil 703 instead of hanging below it. In this embodiment, the KCU 702 may control the kite by performing any one or more of differentially pulling the pitch and steering tethers 704,708; deforming or twisting the shape of the airfoil 703; and actuating various control surfaces.

The KCU configuration 700 is advantageous over the 3-line configuration 701 in that the KCU configuration 700 connects the airfoil 703 to the ground station or ground station module using only the single tether 102, which results in less drag than the three tethers 706, 708a,b used in the 3-line configuration 701. Additionally, the single tether 102 used in the KCU configuration 700 can be handled and controlled at the ground station or ground station module using fewer pieces of equipment than the three tethers 706, 708a,b used in the 3-line configuration 701, allowing for use of a relatively technically simple ground station or ground station module.

The 3-line configuration 701 is advantageous over the KCU configuration 700 in that not using the KCU 702 reduces the mass of equipment that is airborne, which can lower cost and liability in the event an accident occurs, and which can facilitate public acceptance of pumping kite technology. The 3-line configuration 701 also has only a single element, the airfoil 703, at the end of the tethers 706, 708a,b as opposed to the two elements present in the KCU configuration 700. Consequently, the 3-line configuration 701 can be controlled using simpler algorithms and processes than the KCU configuration 700. Additionally, as operating the 3-line configuration 701 does not involving communicating with the airborne KCU 702, using the 3-line configuration 701 involves fewer communication challenges than using the KCU configuration 700. The tethers 706, 708a,b used in the 3-line configuration 701 accordingly also do not need to include the power or communication wiring that is present in the KCU configuration 700 for the KCU 702's use.

Figure 8:
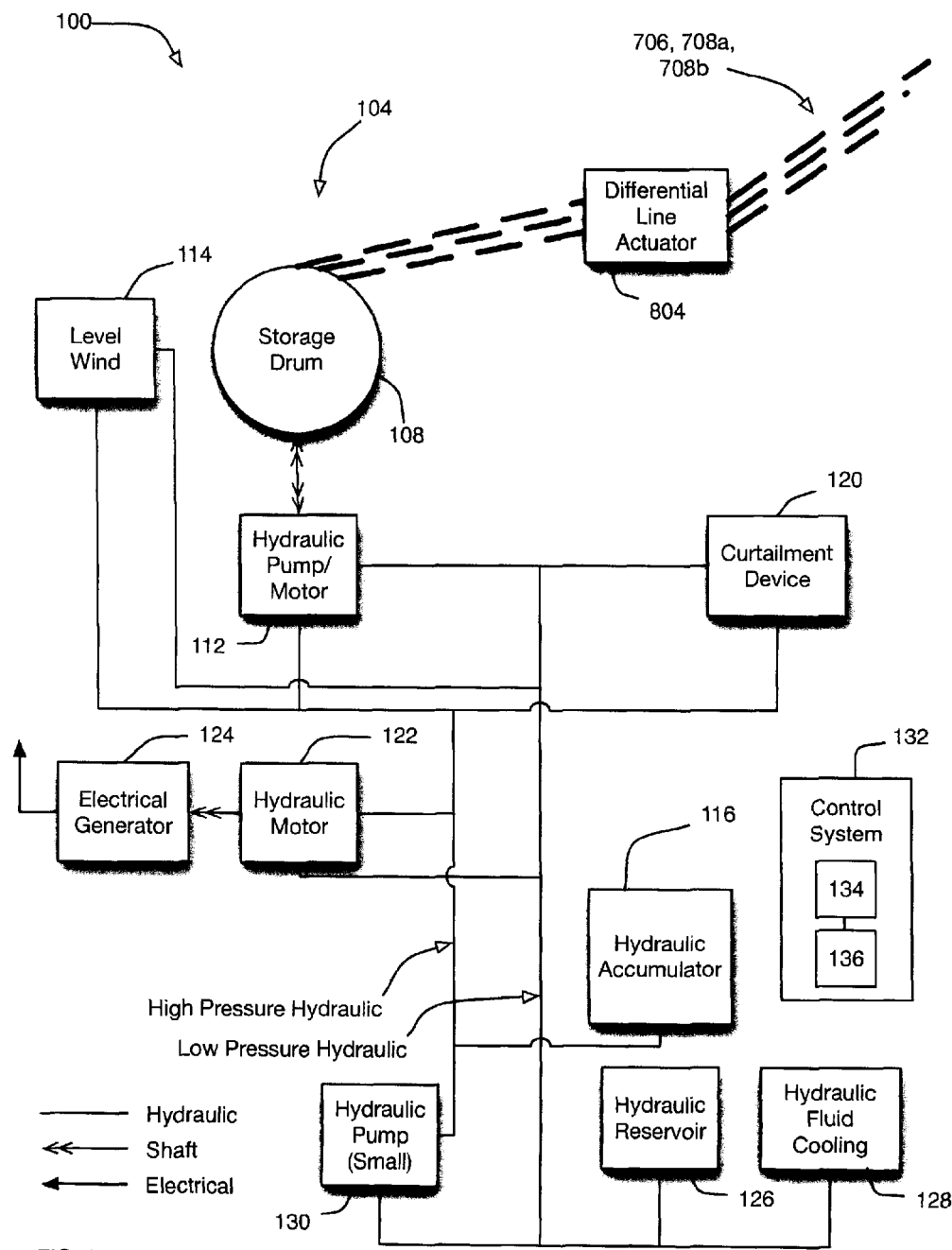
FIG. 8 depicts a system for harnessing wind energy using the tethered airfoil according to a seventh embodiment in which the airfoil is tethered to the ground using three tethers, and in which a differential line actuator is used to change the relative length of the three tethers.

Referring now to FIG. 8, there is shown another embodiment of the system 100 that is substantively similar to the embodiment of the system 100 depicted in FIG. 1, with the exception that the winching device 104 includes the storage drum 108 and a differential line actuator 804, and does not include the double capstan 105. The differential line actuator 804 is configured to be used with the 3-line configuration 701 of the airfoil 703, and is coupled to the unified pitch tether 706 and to the steering tethers 708 to be able to adjust their relative lengths. After passing through the differential line actuator 804, the pitch and steering tethers 706, 708 are wound on to the storage drum 108. In the depicted embodiment the pitch and steering tethers 706, 708 are wound on to different portions of the same storage drum 108 such that they do not overlap with each other. However, in an alternative embodiment (not shown) each of the tethers 706, 708a,b may be wound on to its own storage drum.

As discussed above, the differential line actuator 804 is able to adjust the lengths of the right and left steering tethers 708a,b relative to each other, and also to adjust the length of the steering tethers 708 relative to the unified pitch tether 706 in order to steer and adjust the angle of attack of the airfoil 703. A schematic illustrating how the differential line actuator 804 adjusts the length of the unified pitch tether 706 is shown in FIG. 10(a), while a schematic showing how the differential line actuator 804 adjusts the lengths of the steering tethers 708 is shown in FIG. 10(b).

In FIG. 10(a), as the unified pitch tether 706 approaches the ground station from the airfoil 703 it is first wound around a movable pitch tether sheave 1002 and then a reference pitch tether sheave 1006 before being wound around the storage drum 108. The reference pitch tether sheave 1006 is stationary relative to the ground while the movable pitch tether sheave 1006 is laterally movable as indicated by the arrows in FIG. 10(a). When the movable pitch tether sheave 1006 is shifted away from the reference pitch tether sheave 1004, the unified pitch tether 706 shortens; when the movable pitch tether sheave 1006 is shifted towards the reference pitch tether sheave 1004, the unified pitch tether 706 lengthens.

Similarly, in FIG. 10(b) as the right steering tether 708a approaches the ground station from the airfoil 703 it is first wound around a movable right steering tether sheave 1006 and then a reference right steering tether sheave 1006 before being wound around the storage drum 108. As the left steering tether 708b approaches the ground station from the airfoil 703 it is first wound around a movable left steering tether sheave 1010 and then a reference left steering tether sheave 1012 before being wound around the storage drum 108. The reference steering tether sheaves 1008, 1012 are stationary relative to the ground while the movable steering tether sheaves 1006, 1010 are laterally movable as indicated by the arrows in FIG. 10(b). In order to adjust the length of one of the steering tethers 708 relative to another, one of the movable steering tether sheaves 1006, 1010 can be moved relative to the other. For example, to steer the airfoil 703 towards the right steering tether 708a, the movable right steering tether sheave 1006 can be shifted away from the reference right steering tether sheave 1008; the movable left steering tether sheave 1010 can be shifted towards the reference left steering tether sheave 1012; or both. In order to adjust the angle of attack of the airfoil 703, the length of the unified pitch tether 706 may be adjusted while holding both the movable steering tether sheaves 1006, 1010 stationary; the movable steering tether sheaves 1006, 1010 may be moved in unison while holding the movable pitch tether sheave 1002 stationary; or both.

Figure 10:
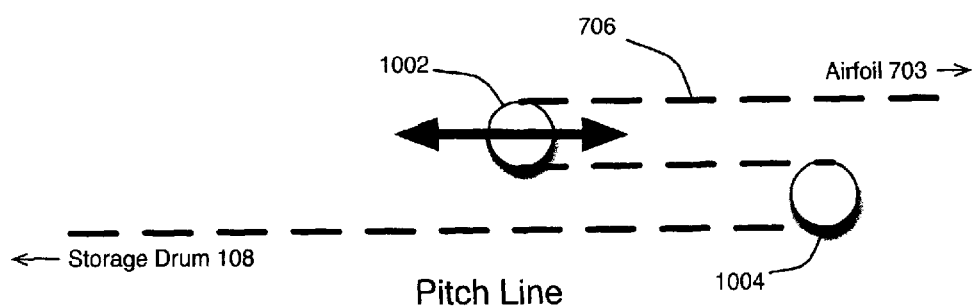
FIGS. 10(a) and 10(b) schematically depict how the differential line actuator shown in FIG. 8 changes the relative lengths of the three tethers.
FIG. 10(c) is a perspective view of an apparatus that forms part of the differential line actuator shown in FIG. 8 and that can be used to control the relative length of the tethers.
Figure 10:
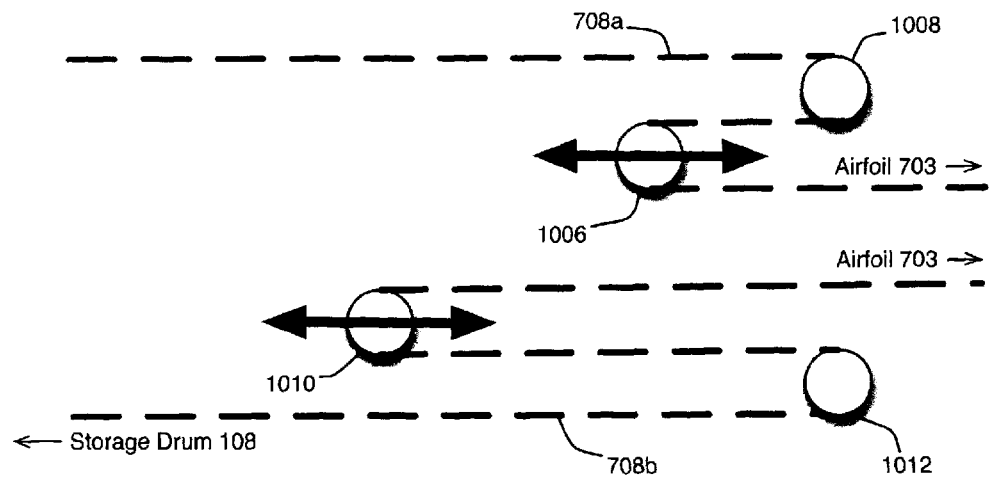
Figure 10C:
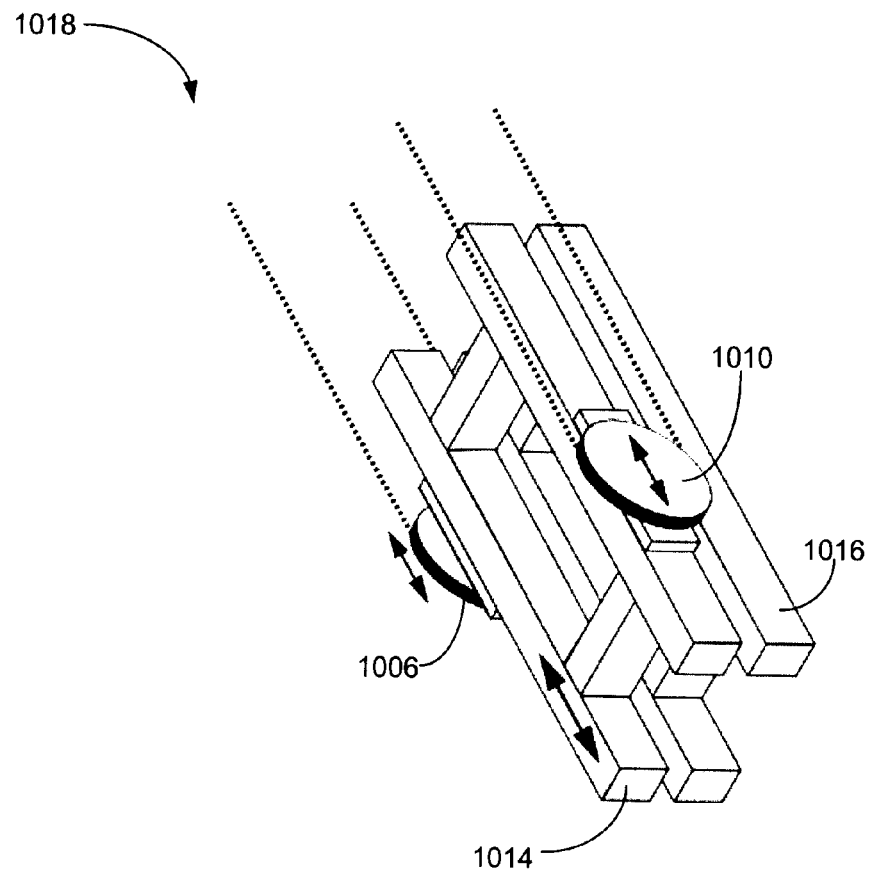

Referring now to FIG. 10(c), there is shown an apparatus 1018 that can be used to control the movement of the movable steering tether sheaves 1006, 1010 and that can consequently form a part of the differential line actuator 804. The apparatus 1018 includes a reference table 1016 and a movable table 1014 that are adjacent to each other and that are longitudinally slidable relative to each other. In the depicted embodiment each of the tables 1014, 1016 is constructed from two longitudinally extending beams between which are laid and to which are secured two transversely extending beams to form a rectangular table. However, in other embodiments the tables, or any suitable type of substrate, may be constructed in another suitable manner.

Mounted on to the side of the movable table 1014 is the movable right steering tether sheave 1006, and mounted on to the other side of the movable table 1014 is the movable left steering tether sheave 1010. Each of the movable steering tether sheaves 1006, 1010 is longitudinally slidable on the movable table 1014 relative to the other of the movable steering tether sheaves 1006, 1010, which allows the lengths of the steering tethers 708 to be adjusted relative to each other. The movable steering tether sheaves 1006, 1010 can also be held stationary relative to the movable table 1014 and the movable table 1014 can then be moved relative to the reference table 1016 in order to adjust the length of the unified pitch tether 706 relative to the lengths of the steering tethers 708, thereby changing the angle of attack of the airfoil 703. Although not depicted, a similar apparatus can be used to adjust the length of the unified pitch tether 706. In one embodiment the movable steering tether sheaves 1006, 1010 are each coupled to a belt that simultaneously moves both of the movable steering tether sheaves 1006, 1010; alternatively, the movable steering tether sheaves 1006, 1010 may each be independently longitudinally slidable.

Figure 9:
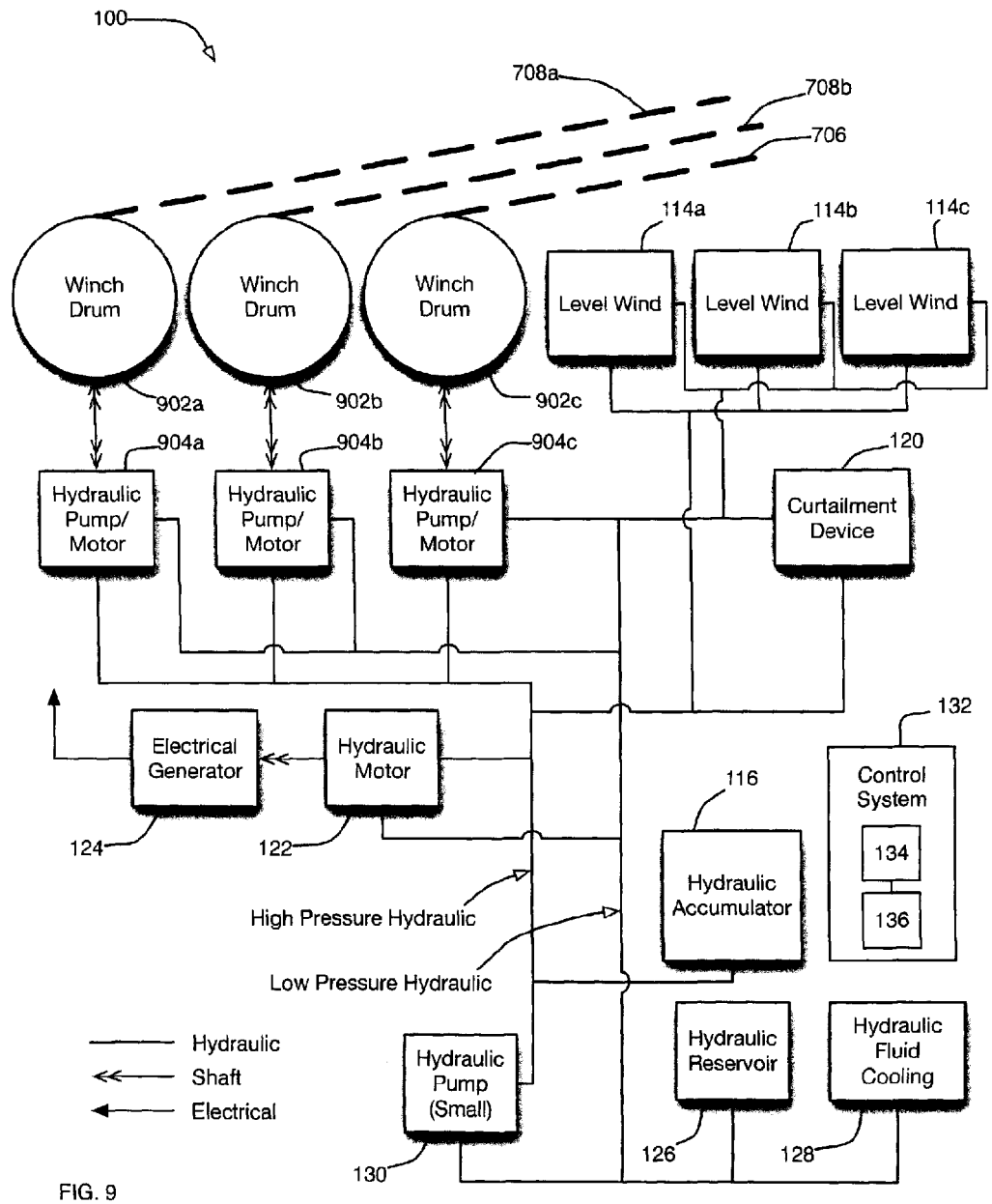
FIG. 9 depicts a system for harnessing wind energy using the tethered airfoil according to an eighth embodiment in which the airfoil is tethered to the ground using three tethers, and in which winch drums are used to change the relative length of the three tethers.

Referring now to FIG. 9, there is depicted another embodiment of the system 100 used to harness wind power that is substantively similar to the embodiment of the system 100 depicted in FIG. 8, with the exception that the storage drum 108 and the differential line actuator 804 have been replaced by three winch drums 902a-c, each of which is respectively independently powered by a hydraulic pump/motor 904a-c. The right steering tether 708a is wound on one of the winch drums 902a, the left steering tether 708b is wound on another of the winch drums 902b, while the unified pitch tether 706 is wound on the third of the winch drums 902c. Changing the relative lengths of the tethers 706, 708a,b using the winch drums 902a-c of FIG. 9 is more efficient than using the differential line actuator 804 shown in FIG. 8 because line losses are reduced when independently controlling tether length using the winches 902a-c. However, the embodiment shown in FIG. 9 utilizes three of the hydraulic pump/motors 904a-c as opposed to the one hydraulic pump/motor 112 used in the embodiment of FIG. 8. The cost of the hydraulic pump/motors 112, 904a-c can consequently render the embodiment of FIG. 9 uneconomical for relatively small scale wind power plants. Optionally the control systems of the hydraulic pump/motors 904a-c can communicate with each other to increase accuracy when adjusting the relative lengths of the tethers 706, 708a,b.

In the foregoing embodiments, variable displacement hydraulic pump/motors can be used for the hydraulic pump/motors 110a,b, 112, 904a-c. An exemplary variable displacement hydraulic pump/motor that can be used is a secondary control Bosch™ Rexroth™ pump such as the A4VSO40-DS1, controlled using an HNC100-SEK digital controller assembly. In particular, using variable displacement hydraulic pump/motors allows the speed and torque of the output shafts of the hydraulic pump/motors 110a,b, 112, 904a-c to be directly controlled by an operator, which is useful for precisely controlling the lengths of the tethers 102, 706, 708 without using inefficient, energy wasting throttling valves. In the foregoing embodiments, throttling valves can be avoided as the various hydraulic elements are pressure coupled, in that they experience substantially the same pressure, but not necessarily the same flow of hydraulic fluid; this is opposed to their being flow coupled, in which they would experience the same flow of hydraulic fluid, but not necessarily substantially the same pressure.

The method employed by the control system 132 to control any of the foregoing embodiments of the system 100 can be stored on a computer readable medium for execution by a any suitable controller, such as a processor, microcontroller, programmable logic controller, field programmable gate array, or can be implemented in hardware using, for example, an application-specific integrated circuit. For example, the control system 132 may include a programmable logic controller having one or both of an internal and an external memory that either individually or collectively encoded thereon statements and instructions to cause the control system 132 to execute any of the foregoing embodiments of methods. Exemplary computer readable media include disc-based media such as CD-ROMs and DVDs, magnetic media such as hard drives and other forms of magnetic disk storage, semiconductor based media such as flash media, random access memory, and read only memory.

For the sake of convenience, the exemplary embodiments above are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

While particular example embodiments have been described in the foregoing, it is to be understood that other embodiments are possible and are intended to be included herein. It will be clear to any person skilled in the art that modifications of and adjustments to the foregoing example embodiments, not shown, are possible.

The invention claimed is:

1. A system for harnessing wind energy using a tethered airfoil, the system comprising:
(a) an airfoil;
(b) a tether coupled to the airfoil;
(c) a winching device around which the tether is wrapped, the winching device configured to allow the tether to extend during a traction phase and to retract the tether during a retraction phase;
(d) an accumulator configured to store harnessed wind energy;
(e) a winching device hydraulic pump/motor mechanically coupled to the winching device and hydraulically coupled to the accumulator, the winching device hydraulic pump/motor configured to convert the harnessed wind energy stored in the accumulator to actuate the winching device to retract the tether during the retraction phase, and to transfer the harnessed wind energy harnessed via extension of the tether from the winching device to the accumulator for storage during the traction phase; and
(f) a control system communicatively coupled to the winching device hydraulic pump/motor and the accumulator, the control system configured to perform a method comprising:

(i) during the traction phase, allowing wind to extend the tether and storing in the accumulator the harnessed wind energy prior to using the harnessed wind energy to generate electricity; and (ii) during the retraction phase, using the harnessed wind energy stored in the accumulator to retract the tether.

2. A system as claimed in claim 1 further comprising:
(a) a hydraulic motor hydraulically coupled to the accumulator and to the winching device hydraulic pump/motor; and
(b) an electrical generator mechanically coupled to the hydraulic motor that generates electricity using the harnessed wind energy.

3. A system as claimed in claim 2 wherein the electricity is generated using the harnessed wind energy stored in the accumulator.

4. A system as claimed in claim 3 wherein the electricity is generated during the retraction phase.

5. A system as claimed in claim 2 wherein the method further comprises:
(a) determining, during the traction phase, whether the wind energy being harnessed is sufficient to generate the electricity at a certain power threshold; and
(b) when the wind energy being harnessed is insufficient to generate the electricity at the certain power threshold, using the harnessed wind energy stored in the accumulator to supplement the wind energy being harnessed such that the electricity is generated at the certain power threshold.

6. A system as claimed in claim 2 wherein the method further comprises:
(a) determining, during the traction phase, whether the wind energy being harnessed exceeds that used to generate the electricity at a certain power threshold; and
(b) when the wind energy being harnessed exceeds that used to generate the electricity at the certain power threshold, storing the wind energy in excess of that used to generate the electricity at the certain power threshold in the accumulator.

7. A system as claimed in claim 2 wherein the method further comprises:
(a) determining whether available wind energy comprising the wind energy being harnessed and the harnessed wind energy stored in the accumulator is sufficient to generate the electricity at a certain power threshold; and
(b) when the available wind energy is insufficient to generate the electricity at the certain power threshold, using a dispatchable generator to supplement the available wind energy such that the electricity is generated at the certain power threshold.

8. A system as claimed in claim 1 further comprising a curtailment device hydraulically coupled to the winching device hydraulic pump/motor and wherein the method further comprises:
(a) determining whether the accumulator has sufficient storage capacity to store the wind energy being harnessed; and
(b) when the accumulator has insufficient storage capacity to store the wind energy being harnessed, dissipating the wind energy being harnessed that cannot be stored using the curtailment device.

9. A system as claimed in claim 2 wherein the electricity is generated at a power level that is constant.

10. A system as claimed in claim 2 wherein the electricity is generated at a power level that varies with electrical load to be satisfied by a utility.

11. A system as claimed in claim 2 further comprising an engine mechanically coupled between the electrical generator and the hydraulic motor.

12. A system as claimed in claim 2 further comprising an engine mechanically coupled to a genset electrical generator, and wherein outputs of the electrical generator and the genset electrical generator are electrically coupled together.

13. A system as claimed in claim 2 further comprising an engine and a hydraulic pump mechanically coupled to the engine and hydraulically coupled to the accumulator.

14. A system as claimed in claim 2 further comprising a plurality of ground station modules disposed remotely from and hydraulically coupled to a generation module, and wherein:
(a) each of the plurality of ground station modules comprises the airfoil, the tether, the winching device, and the winching device hydraulic pump/motor; and
(b) the generation module comprises the accumulator, the hydraulic motor, and the electrical generator.

15. A system as claimed in claim 2 further comprising a plurality of ground station modules disposed remotely from and electrically coupled to an electrical control module, and wherein:
(a) each of the plurality of ground station modules comprises the airfoil, the tether, the winching device, the accumulator, the winching device hydraulic pump/motor, the hydraulic motor, and the electrical generator; and
(b) the electrical control module comprises a switching network such that any one of the plurality of the ground station modules can be electrically coupled to any one or more of the other ground station modules.

16. A system as claimed in claim 1 wherein the winching device hydraulic pump/motor comprises a variable displacement hydraulic pump/motor.

17. A system as claimed in claim 1 wherein at least three kite tethers comprising two steering tethers and a pitch tether are coupled to the airfoil and wherein the traction winch comprises three winch drums, each of which has wrapped thereon one of the tethers.

18. A system as claimed in claim 1 further comprising:
(a) a kite control unit that is airborne when the wind energy is being harnessed;
(b) at least three kite tethers, comprising two steering tethers and a pitch tether, that couple the kite control unit to the airfoil,
and wherein an additional kite tether couples the kite control unit to the winching device.

19. A system as claimed in claim 17 further comprising a differential line actuator coupled between the traction winch and the airfoil and configured to adjust the lengths of the steering tethers relative to each other and the length of the pitch tether relative to the steering tethers.

20. A system as claimed in claim 19 wherein the differential line actuator comprises:
(a) a reference table;
(b) a movable table movable relative to the reference table along a longitudinal axis; and
(c) movable steering tether sheaves mounted on the movable table, wherein the movable steering tether sheaves are each longitudinally movable relative to the movable table.

* * * * *